(12) United States Patent
Ichino et al.

(10) Patent No.: US 12,264,241 B2
(45) Date of Patent: Apr. 1, 2025

(54) HYDROGENATED COPOLYMER, ADHESIVE FILM, RESIN COMPOSITION, AND MOLDED ARTICLE

(71) Applicant: Asahi Kasei Kabushiki Kaisha, Tokyo (JP)

(72) Inventors: Hiroyuki Ichino, Tokyo (JP); Yasuhiro Kusanose, Tokyo (JP); Toshikazu Hoshina, Tokyo (JP); Takahiro Tsuji, Tokyo (JP); Takahiro Hisasue, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 596 days.

(21) Appl. No.: 17/611,739

(22) PCT Filed: May 18, 2020

(86) PCT No.: PCT/JP2020/019615
§ 371 (c)(1),
(2) Date: Nov. 16, 2021

(87) PCT Pub. No.: WO2020/235521
PCT Pub. Date: Nov. 26, 2020

(65) Prior Publication Data
US 2022/0243050 A1  Aug. 4, 2022

(30) Foreign Application Priority Data

May 23, 2019 (JP) .................................. 2019-097021
Nov. 15, 2019 (JP) .................................. 2019-207189

(51) Int. Cl.
*C08L 53/02* (2006.01)
*C09J 153/02* (2006.01)

(52) U.S. Cl.
CPC ............. *C08L 53/02* (2013.01); *C09J 153/02* (2013.01)

(58) Field of Classification Search
CPC ..................................................... C08L 53/02
See application file for complete search history.

(56) References Cited

U.S. PATENT DOCUMENTS 6,509,412 B1 *  1/2003  Hall ...................... C08L 53/025
                                                            524/508
2005/0234193 A1  10/2005  Sasagawa et al.
(Continued)

FOREIGN PATENT DOCUMENTS

| CN | 102119190 A | 7/2011 |
| CN | 107922557 A | 4/2018 |

(Continued)

OTHER PUBLICATIONS

Supplemental European Search Report issued in counterpart European Patent Application No. 20810655.9 dated Jun. 23, 2022.
(Continued)

*Primary Examiner* — Robert C Boyle
(74) *Attorney, Agent, or Firm* — Morgan, Lewis & Bockius LLP

(57) ABSTRACT

A hydrogenated copolymer containing
a hydrogenated copolymer (a) prepared by hydrogenating a copolymer of a vinyl aromatic compound and a conjugated diene compound, and
a hydrogenated copolymer (b) prepared by hydrogenating a copolymer of a vinyl aromatic compound and a conjugated diene compound, wherein
a mass ratio (a)/(b) of a content of the hydrogenated copolymer (a) to a content of the hydrogenated copolymer (b) is 5/95 to 95/5,
the hydrogenated copolymer (a) has a hydrogenated polymer block (B1) and a hydrogenated polymer block (B2), (Continued)

the hydrogenated polymer block (B1) consists of a vinyl aromatic compound and a conjugated diene compound and has a content of the vinyl aromatic compound of 40 to 80 mass %, and the hydrogenated polymer block (B2) mainly contains a conjugated diene compound and has a vinyl bond content of 60 to 100 mol % before hydrogenation.

6 Claims, 6 Drawing Sheets

(56) References Cited

U.S. PATENT DOCUMENTS

| | | |
|---|---|---|
| 2010/0087559 A1 | 4/2010 | Kusanose et al. |
| 2013/0331519 A1 | 12/2013 | Sawasato et al. |
| 2016/0237277 A1* | 8/2016 | I .............................. C08L 23/12 |
| 2018/0244822 A1* | 8/2018 | Kusanose .................. C09J 7/20 |
| 2019/0144644 A1 | 5/2019 | Takeda |
| 2019/0144645 A1 | 5/2019 | Takeda |
| 2019/0144647 A1 | 5/2019 | Miura |
| 2019/0367724 A1 | 12/2019 | Hisasue et al. |

FOREIGN PATENT DOCUMENTS

| | | | |
|---|---|---|---|
| EP | 3845599 A1 | 7/2021 | |
| JP | H07-188508 A | 7/1995 | |
| JP | 2006-291128 A | 10/2006 | |
| JP | 2010-053319 A | 3/2010 | |
| JP | 2010-235666 A | 10/2010 | |
| JP | 2019-089985 A | 6/2019 | |
| JP | 2019-089986 A | 6/2019 | |
| JP | 2019-089987 A | 6/2019 | |
| WO | 2004/003027 A1 | 1/2004 | |
| WO | 2008/018445 A1 | 2/2008 | |
| WO | 2012/117964 A1 | 9/2012 | |
| WO | WO-2017043532 A1 * | 3/2017 | ............. B32B 27/00 |
| WO | 2018/139122 A1 | 8/2018 | |
| WO | 2020/045496 A1 | 3/2020 | |

OTHER PUBLICATIONS

International Search Report issued in corresponding International Patent Application No. PCT/JP2020/019615 dated Aug. 4, 2020.
International Preliminary Report on Patentability and Written Opinion issued in corresponding International Patent Application No. PCT/JP2020/019615 dated Dec. 2, 2021.

* cited by examiner

[Figure 1]
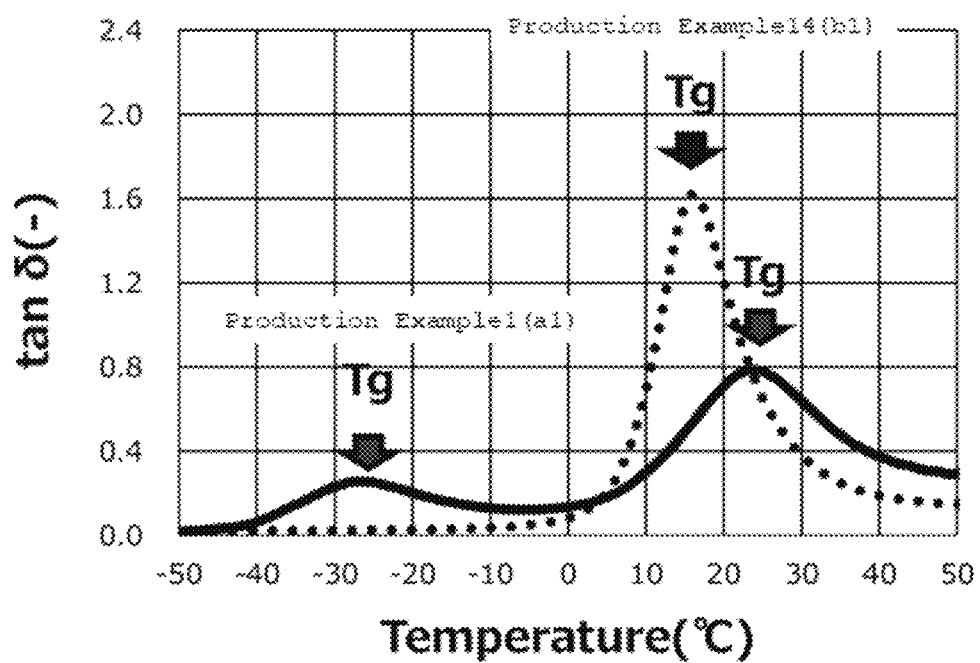

[Figure 2]
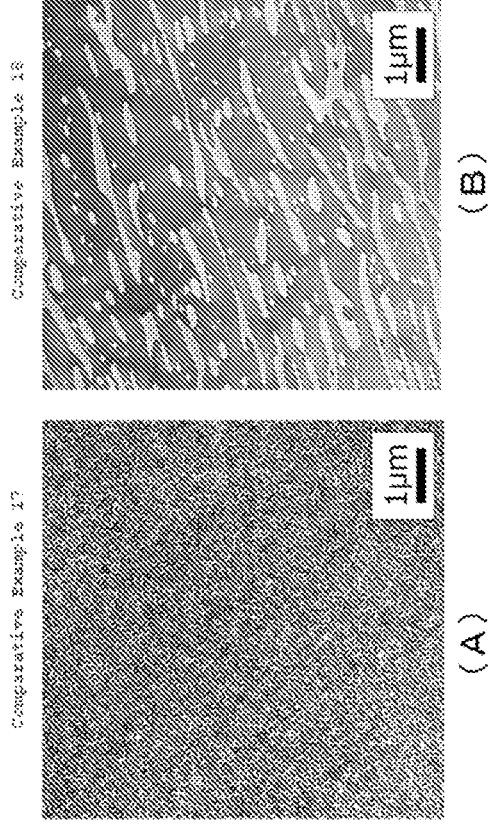

[Figure 3]
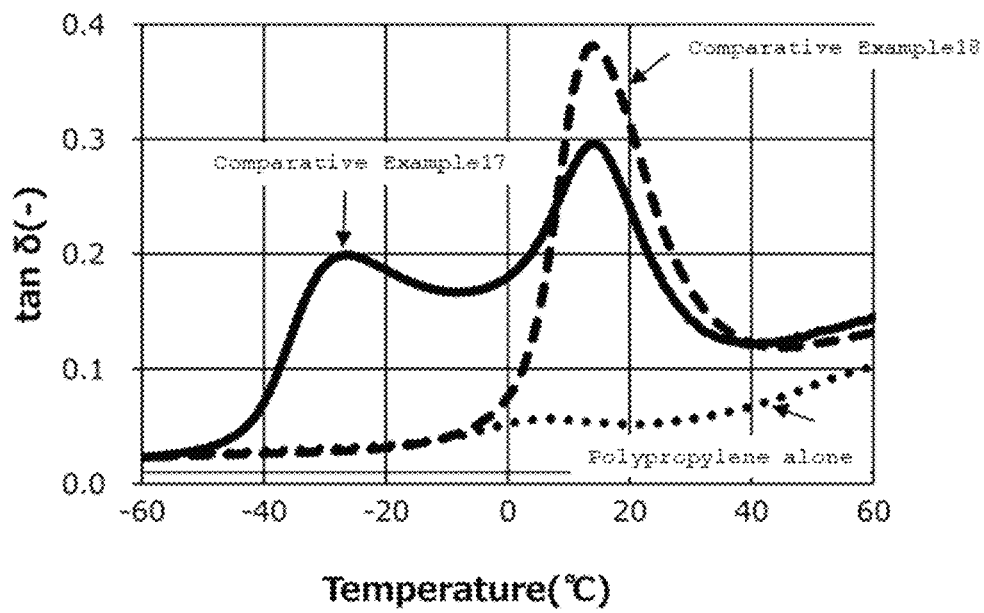
[Figure 4]
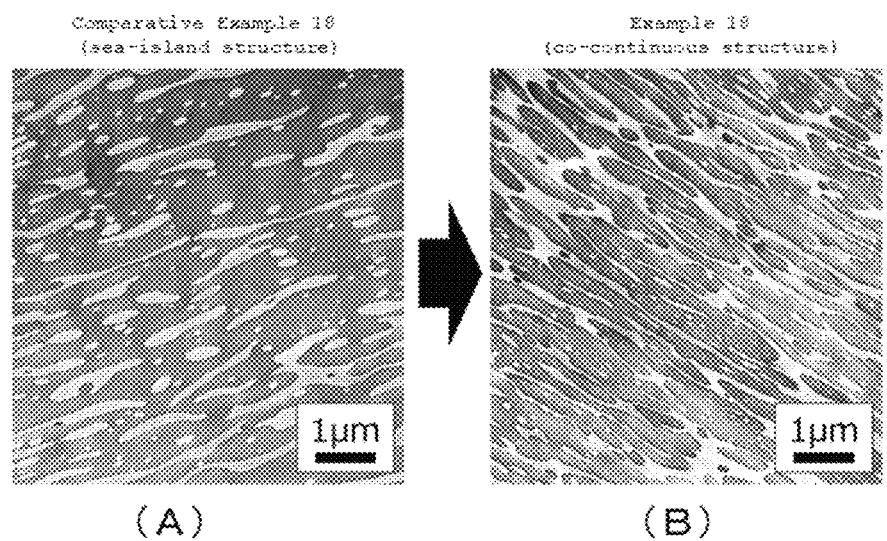

[Figure 5]
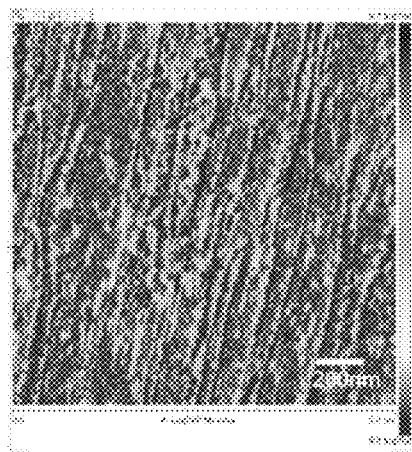
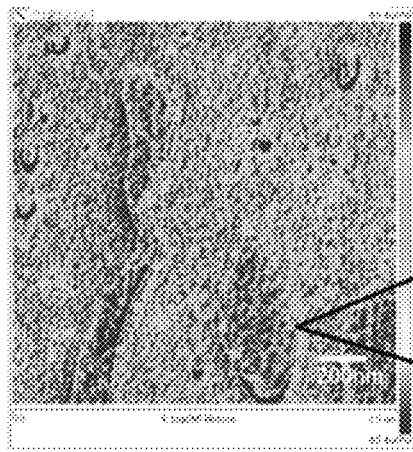
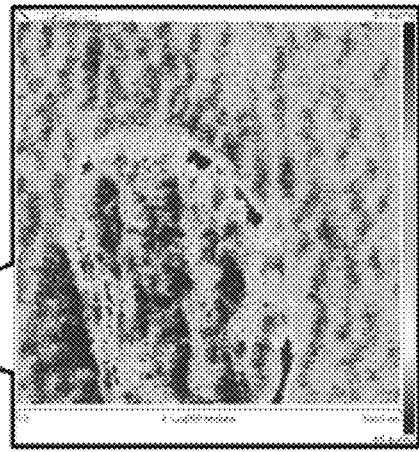
(A) Example 18 (surface layer portion)
(B) Example 18 (core portion)
(C)

[Figure 6]
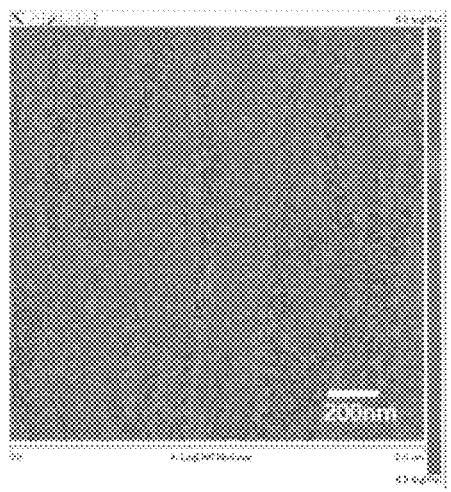
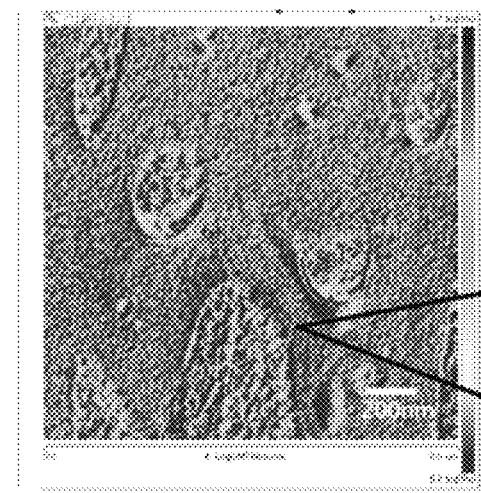
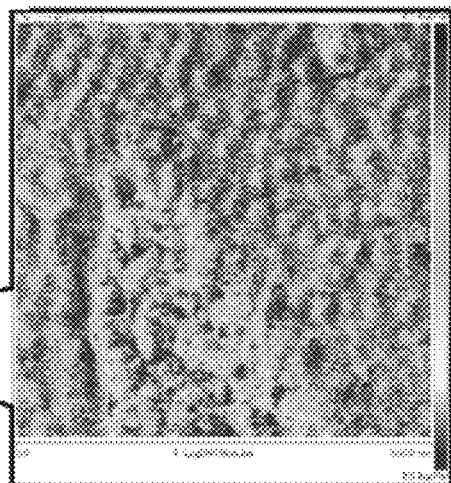

[Figure 7]
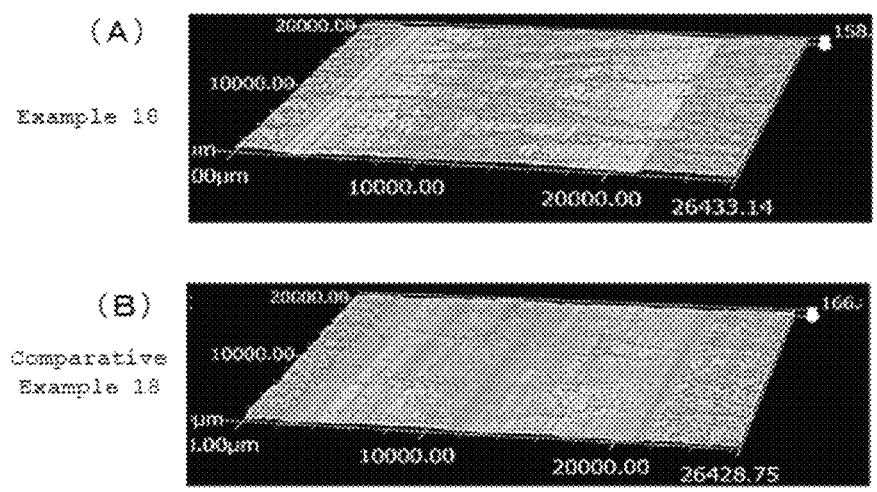

HYDROGENATED COPOLYMER, ADHESIVE FILM, RESIN COMPOSITION, AND MOLDED ARTICLE

TECHNICAL FIELD

The present invention relates to a hydrogenated copolymer, an adhesive film, a resin composition, and a molded article.

BACKGROUND ART

Hydrogenation products of copolymers of a conjugated diene compound and a vinyl aromatic compound have elasticity similar to that of natural rubbers or synthetic rubbers at room temperature, also have molding processability similar to that of thermoplastic resins at high temperatures, and furthermore, are excellent in weather resistance and heat resistance, and as such, have heretofore been used in a wide range of fields such as plastic modifiers, automobile parts, medical molded products, asphalt modifiers, footwear, molded products such as food containers, packaging materials, viscous adhesive sheets, and home appliances or industrial parts.

For example, Patent Document 1 discloses a hydrogenated copolymer obtained by hydrogenating a unhydrogenated copolymer containing a random copolymer of a conjugated diene monomer unit and a vinyl aromatic monomer unit, and a resin composition containing the hydrogenated copolymer and a thermoplastic resin or a rubber-like polymer. The Document states that this resin composition is excellent in mechanical characteristics, abrasion resistance, etc. and is capable of serving as an alternative material of flexible polyvinyl chloride resin.

CITATION LIST

Patent Document

Patent Document 1: International Publication No. WO 2004/003027

SUMMARY OF INVENTION

Technical Problem

Unfortunately, a hydrogenated copolymer disclosed in Patent Document 1 has poor compatibility with thermoplastic resins such as polypropylene and further has low mechanical characteristics at low temperatures due to the presence of its loss tangent (tan δ) at −10° C. to 80° C. Hence, its problem is difficult application to purposes that require compatibility with thermoplastic resins such as polypropylene, abrasion resistance, and mechanical characteristics at low temperatures, for example, automobile members, medical members, adhesive films with polyolefin as a base material, etc.

Examples of the characteristics required for resin compositions of a hydrogenated copolymer and a thermoplastic resin (e.g., polypropylene) or a rubber-like polymer include: favorable abrasion resistance, low-temperature mechanical characteristics, and balance among characteristics for automobile members such as automobile interior skin materials, medical members such as infusion bags and infusion tubes, adhesive films with polyolefin as a base material, the field of food packaging, and the field of apparel packaging; and favorable initial tackiness, adhesion increasing properties, feedability, and balance among characteristics for adhesive films. Any resin composition that satisfies these characteristics has not yet been obtained.

Accordingly, in light of the problems of the conventional techniques mentioned above, an object of the present invention is to provide a hydrogenated copolymer that can impart favorable abrasion resistance, low-temperature mechanical characteristics, and balance among characteristics to a resin composition when mixed with a thermoplastic resin (e.g., polypropylene) or a rubber-like polymer, and impart favorable initial tackiness, adhesion increasing properties, feedability, and balance among characteristics to an adhesive film.

Solution to Problem

The present inventors have conducted diligent studies to attain the object and consequently completed the present embodiment by finding that a resin composition containing two hydrogenated copolymers having a predetermined structure at a particular mass ratio can solve the problems of the conventional techniques mentioned above.

Specifically, the present invention is as follows.

[1]

A hydrogenated copolymer comprising
  a hydrogenated copolymer (a) prepared by hydrogenating a copolymer of a vinyl aromatic compound and a conjugated diene compound, and
  a hydrogenated copolymer (b) prepared by hydrogenating a copolymer of a vinyl aromatic compound and a conjugated diene compound, wherein
  a mass ratio (a)/(b) of a content of the hydrogenated copolymer (a) to a content of the hydrogenated copolymer (b) is 5/95 to 95/5,
  the hydrogenated copolymer (a) has a hydrogenated polymer block (B1) and a hydrogenated polymer block (B2),
  the hydrogenated polymer block (B1) consists of a vinyl aromatic compound and a conjugated diene compound and has a content of the vinyl aromatic compound of 40 to 80 mass %,
  the hydrogenated polymer block (B2) mainly comprises a conjugated diene compound and has a vinyl bond content of 60 to 100 mol % before hydrogenation,
  the hydrogenated copolymer (b) has a hydrogenated polymer block (B3) consisting of a vinyl aromatic compound and a conjugated diene compound, and a content of the vinyl aromatic compound in the hydrogenated polymer block (B3) is 20 to 90 mass %.

[2]

The hydrogenated copolymer according to [1], wherein the content of the vinyl aromatic compound in the hydrogenated polymer block (B1) in the hydrogenated copolymer (a) is 46 to 80 mass %.

[3]

The hydrogenated copolymer according to [1] or [2], wherein the hydrogenated copolymer (b) has only one tan δ peak at −35° C. or higher in viscoelasticity measurement (1 Hz).

[4]

The hydrogenated copolymer according to any one of [1] to [3], wherein the mass ratio (a)/(b) of the content of the hydrogenated copolymer (a) to the content of the hydrogenated copolymer (b) in the hydrogenated copolymer is 5/95 to 70/30.

[5]

An adhesive film comprising a hydrogenated copolymer according to any one of [1] to [4].

[6]

A resin composition comprising a hydrogenated copolymer according to any one of [1] to [4] and a polypropylene resin (c), wherein a mass ratio of the polypropylene resin (c) to the total content of the hydrogenated copolymer (a) and the hydrogenated copolymer (b) [(c)/((a)+(b))] is 95/5 to 5/95.

[7]

A molded article of a resin composition according to [6].

Advantageous Effects of Invention

The present invention can provide a hydrogenated copolymer that can impart favorable abrasion resistance, low-temperature mechanical characteristics, and balance among characteristics to a resin composition when mixed with a thermoplastic resin (e.g., polypropylene) or a rubber-like polymer, and can impart favorable initial tackiness, adhesion increasing properties, feedability, and balance among characteristics to an adhesive film.

BRIEF DESCRIPTION OF DRAWINGS

FIG. 1 shows the temperature dependence of a loss tangent in Production Example 1 (a1) and Production Example 14 (b1).

FIG. 2(A) shows an image obtained by morphologically observing a molded article of a polypropylene resin composition of Comparative Example 17 under a transmission electron microscope (ruthenium staining). FIG. 2(B) shows an image obtained by morphologically observing a molded article of a polypropylene resin composition of Comparative Example 18 under a transmission electron microscope (ruthenium staining).

FIG. 3 shows the temperature dependence of the loss tangents of a polypropylene resin composition in Comparative Examples 17 and 18 and a molded article of a polypropylene alone.

FIG. 4(A) shows an image obtained by morphologically observing a molded article of a polypropylene resin composition of Comparative Example 18 under a transmission electron microscope (ruthenium staining). FIG. 4(B) shows an image obtained by morphologically observing a molded article of a polypropylene resin composition of Example 18 under a transmission electron microscope (ruthenium staining).

FIG. 5(A) shows an elastic modulus mapping diagram of a surface layer portion of a molded plate of Example 18 under AFM. FIG. 5(B) shows an elastic modulus mapping diagram of a core portion of the molded plate of Example 18 under AFM. FIG. 5(C) shows a partially enlarged view of FIG. 5(B).

FIG. 6(A) shows an elastic modulus mapping diagram of a surface layer portion of a molded plate of Comparative Example 18 under AFM. FIG. 6(B) shows an elastic modulus mapping diagram of a core portion of the molded plate of Comparative Example 18 under AFM. FIG. 5(C) shows a partially enlarged view of FIG. 6(B).

FIG. 7(A) shows a laser microscope observation image of the surface of a molded article of Example 18 after abrasion (10000 times). FIG. 7(B) shows a laser microscope observation image of the surface of a molded article of Comparative Example 18 after abrasion.

DESCRIPTION OF EMBODIMENTS

Hereinafter, the mode for carrying out the present invention (hereinafter, simply referred to as the "present embodiment") will be described in detail. However, the present invention is not limited by the embodiment given below and can be carried out with various changes or modifications made therein without departing from the spirit of the present invention.

[Hydrogenated Copolymer]

The hydrogenated copolymer of the present embodiment contains a hydrogenated copolymer (a) and a hydrogenated copolymer (b).

The mass ratio (a)/(b) of the content of the hydrogenated copolymer (a) to the content of the hydrogenated copolymer (b) is 5/95 to 95/5.

The hydrogenated copolymer of the present embodiment has the following configuration.

The hydrogenated copolymer (a) has a hydrogenated polymer block (B1) and a hydrogenated polymer block (B2).

The hydrogenated polymer block (B1) consists of a vinyl aromatic compound and a conjugated diene compound and has a content of the vinyl aromatic compound of 40 to 80 mass %.

The hydrogenated polymer block (B2) mainly contains a conjugated diene compound and has a vinyl bond content of 60 to 100 mol % before hydrogenation.

The hydrogenated copolymer (b) has a polymer block (B3).

The polymer block (B3) consists of a vinyl aromatic compound and a conjugated diene compound and has a content of the vinyl aromatic compound of 20 to 90 mass %.

The hydrogenated copolymer of the present embodiment thus configured imparts favorable abrasion resistance, low-temperature mechanical characteristics, and balance among characteristics to a resin composition when mixed with a thermoplastic resin (e.g., polypropylene) or a rubber-like polymer, and imparts favorable initial tackiness, adhesion increasing properties, feedability, and balance among characteristics to an adhesive film.

Hereinafter, each component will be described in detail.

In the present specification, the phrase "mainly contain (comprise)" means that the polymer block concerned contains more than 70 mass % and 100 mass % or less, preferably 80 mass % or more and 100 mass % or less, more preferably 90 mass % or more and 100 mass % or less, of the monomer unit concerned.

(Hydrogenated Copolymer (a))

The hydrogenated copolymer (a) is a hydrogenated copolymer prepared by hydrogenating a copolymer of a vinyl aromatic compound and a conjugated diene compound and has a hydrogenated polymer block (B1) and a hydrogenated polymer block (B2).

The hydrogenated polymer block (B1) consists of a vinyl aromatic compound and a conjugated diene compound and has a content of the vinyl aromatic compound of 40 to 80 mass %.

The hydrogenated polymer block (B2) mainly contains a conjugated diene compound and has a vinyl bond content of 60 to 100 mol % before hydrogenation.

The hydrogenated polymer block (B2) contains more than 70 mass % and 100 mass % or less of a conjugated diene compound and can therefore be clearly discriminated from the hydrogenated polymer block (B1).

<Vinyl Aromatic Compound>

Examples of the vinyl aromatic compound constituting the hydrogenated copolymer (a) include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Among them, styrene, α-methylstyrene, and 4-methylstyrene are preferred from the viewpoint of availability and productivity.

Only one of these vinyl aromatic compounds may be used, or two or more thereof may be used in combination.

The content of all vinyl aromatic compounds in the hydrogenated copolymer (a) is preferably 20 mass % to 50 mass %, more preferably 23 mass % to 48 mass %, further preferably 25 mass % to 46 mass %.

When the content of vinyl aromatic compounds in the hydrogenated copolymer (a) is 50 mass % or less, a polypropylene resin composition containing the hydrogenated copolymer of the present embodiment tends to have favorable processability. When the content is 20 mass % or more, favorable low stickiness tends to be obtained.

The processability refers to viscosity, tension, flow rate stability, and uneven supply during melting of a resin composition.

If the processability is deteriorated so that a resin composition has too large or too small viscosity and tension when melted or if uneven supply takes place due to an unstable extrusion flow rate resulting from poor compatibility of the hydrogenated copolymer with a polypropylene resin, extrusion molding or injection molding, which is an important processing method, tends to be disadvantageously difficult.

The content of all vinyl aromatic compounds in the hydrogenated copolymer (a) can be measured by an ultraviolet spectrophotometer method or a proton nuclear magnetic resonance ($^1$H-NMR) method. The detailed measurement can be achieved by a method described in Examples mentioned later.

<Conjugated Diene Compound>

The conjugated diene compound constituting the hydrogenated copolymer (a) is not particularly limited as long as the conjugated diene compound is diolefin having conjugated double bonds. Examples thereof include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

Among them, 1,3-butadiene and isoprene are preferred from the viewpoint of availability and productivity. One of these conjugated diene compounds may be used alone, or two or more thereof may be used in combination.

(Hydrogenated Polymer Block (B1))

The hydrogenated copolymer (a) has a hydrogenated polymer block (B1).

The hydrogenated polymer block (B1) consists of a vinyl aromatic compound and a conjugated diene compound.

The content of the vinyl aromatic compound in the hydrogenated polymer block (B1) is 40 mass % to 80 mass %, preferably 46 mass % to 80 mass %, more preferably 48 mass % to 75 mass %, further preferably 50 mass % to 70 mass %.

When the content of the vinyl aromatic compound in the hydrogenated polymer block (B1) is 80 mass % or less, a polypropylene resin composition containing the hydrogenated copolymer of the present embodiment tends to produce excellent low-temperature mechanical characteristics. When the content is 40 mass % or more, excellent abrasion resistance tends to be obtained.

The content of the hydrogenated polymer block (B1) in the hydrogenated copolymer (a) is preferably 20 mass % to 80 mass %, more preferably 25 mass % to 70 mass %, further preferably 30 mass % to 60 mass %, from the viewpoint of imparting favorable low stickiness, C-set, and processability to a polypropylene resin composition containing the hydrogenated copolymer of the present embodiment.

The content of the hydrogenated polymer block (B1) in the hydrogenated copolymer (a) can be measured by a proton nuclear magnetic resonance ($^1$H-NMR) method.

The vinyl bond content of the conjugated diene moiety in a polymer block before hydrogenation of the hydrogenated polymer block (B1) can be controlled by use of an adjuster such as a Lewis base (e.g., ether and amine) mentioned later.

In this context, the vinyl bond content is defined as the ratio of pre-hydrogenated conjugated diene moieties attached by 1,2 bonds and 3,4-bonds with respect to those attached by 1,2-bonds, 3,4-bonds, and 1,4-bonds.

The vinyl bond content in all conjugated diene moieties contained before hydrogenation can be measured by a proton nuclear magnetic resonance ($^1$H-NMR) method. The details are described in Examples mentioned later.

In the case of using 1,3-butadiene as conjugated diene, the 1,2-vinyl bond content of the conjugated diene moiety in a polymer block before hydrogenation of the hydrogenated polymer block (B1) is preferably 5 mol % to 60 mol %, more preferably 10 mol % to 50 mol %, from the viewpoint of imparting favorable processability to a polypropylene resin composition containing the hydrogenated copolymer of the present embodiment.

In the case of using isoprene as conjugated diene or in the case of using 1,3-butadiene and isoprene in combination, the total amount of the 1,2-vinyl bond content and the 3,4-vinyl bond content is preferably 3 mol % to 75 mol %, more preferably 5 mol % to 60 mol %.

(Hydrogenated Polymer Block (B2))

The hydrogenated copolymer (a) has a hydrogenated polymer block (B2).

The hydrogenated polymer block (B2) mainly contains a conjugated diene compound. Specifically, the hydrogenated polymer block (B2) comprises more than 70 mass % and 100 mass % or less of a conjugated diene compound.

The content of the hydrogenated polymer block (B2) in the hydrogenated copolymer (a) is preferably 20 mass % to 80 mass %, more preferably 25 mass % to 70 mass %, further preferably 30 mass % to 60 mass %, from the viewpoint of imparting favorable flexibility and processability to a resin composition containing the hydrogenated copolymer of the present embodiment.

The vinyl bond content of the conjugated diene moiety before hydrogenation in the hydrogenated polymer block (B2) influences the compatibility of the hydrogenated copolymer of the present embodiment with a polypropylene resin and is 60 mol % to 100 mol %, preferably 65 mol % to 95 mol %, more preferably 70 mol % to 90 mol %, from the viewpoint of improving this compatibility.

The vinyl bond content of the conjugated diene moiety before hydrogenation in the hydrogenated polymer block (B2) can be controlled by use of an adjuster such as a Lewis base (e.g., ether and amine) mentioned later.

(Polymer Block a Mainly Containing Vinyl Aromatic Compound)

The hydrogenated copolymer (a) preferably has at least one block mainly containing a vinyl aromatic compound.

Specifically, the hydrogenated copolymer (a) preferably has a block mainly containing a vinyl aromatic compound (hereinafter, also referred to as polymer block A) as a distinct block different from the hydrogenated polymer block (B1) or (B2).

The polymer block A has a content of the vinyl aromatic compound of more than 90 mass %. The polymer block A is thereby clearly discriminated from the polymer block (B1) and the polymer (B2).

The content of the polymer block mainly containing a vinyl aromatic compound in the hydrogenated copolymer (a) is preferably 3 mass % to 30 mass %, more preferably 5 mass % to 28 mass %, further preferably 7 mass % to 25 mass %.

When the content of the polymer block A mainly containing a vinyl aromatic compound in the hydrogenated copolymer (a) is 3 mass % or more, a polypropylene resin composition containing the hydrogenated copolymer of the present embodiment tends to have favorable low stickiness. When the content is 30 mass % or less, excellent processability tends to be obtained.

The content of the polymer block A mainly containing a vinyl aromatic compound in the hydrogenated copolymer (a) can be calculated using the mass of a polymer mainly containing a vinyl aromatic compound (wherein a vinyl aromatic compound having an average degree of polymerization of approximately 30 or less is excluded) determined by a method of oxidatively degrading a pre-hydrogenated copolymer (a') with t-butyl hydroperoxide with osmium tetroxide as a catalyst (method described in I. M. KOLTHOFF, et al., Polym. Sci. 1, 429 (1946)) (hereinafter, referred to as an osmium tetroxide-catalyzed degradation method).

Alternatively, the content of the block mainly containing a vinyl aromatic compound (polymer block A) in the hydrogenated copolymer (a) may be measured with a nuclear magnetic resonance apparatus (NMR) by a method described in Y. Tanaka, et al., RUBBER CHEMISTRY and TECHNOLOGY 54, 685 (1981) using a post-hydrogenated copolymer (hydrogenated copolymer (a)). The details are described in Examples mentioned later.

(Hydrogenated Copolymer (b))

The hydrogenated copolymer of the present embodiment contains a hydrogenated copolymer (b).

The hydrogenated copolymer (b) has a hydrogenated polymer block (B3) consisting of a vinyl aromatic compound and a conjugated diene compound.

The hydrogenated copolymer (b) preferably further has at least one block mainly containing a vinyl aromatic compound (polymer block A) mentioned above.

Examples of the vinyl aromatic compound constituting the hydrogenated copolymer (b) include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Among them, styrene, α-methylstyrene, and 4-methylstyrene are preferably used from the viewpoint of availability and productivity.

Only one of these vinyl aromatic compounds may be used, or two or more thereof may be used in combination.

The conjugated diene compound constituting the hydrogenated copolymer (b) is not particularly limited as long as the conjugated diene compound is diolefin having a pair of conjugated double bonds. Examples thereof include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene.

Among them, 1,3-butadiene and isoprene are preferably used from the viewpoint of availability and productivity.

Only one of these conjugated diene compounds may be used, or two or more thereof may be used in combination.

The hydrogenated copolymer (b) preferably has, for example, a structure as represented by any of the general formulas given below.

The hydrogenated copolymer (b) may be a mixture having plural types of following structures at an arbitrary ratio.

$(A-B3)_n$ $A-(B3-A)_n$ $B3-(A-B3)_n$ $[(B3-A)_n]_m-Z$ $[(A-B3)_n]_m-Z$ $[(B3-A)_n-B3]_m-Z$ $[(A-B3)_n-A]_m-Z$

In each general formula representing the hydrogenated copolymer (b), A is a polymer block mainly containing a vinyl aromatic compound, and B3 is a polymer block consisting of a vinyl aromatic compound and a conjugated diene compound.

The polymer block A has a content of the vinyl aromatic compound of more than 90 mass %. The polymer block A is thereby clearly discriminated from the polymer block (B3).

The boundary between the polymer block A and the polymer block (B3) is not necessarily required to be clearly defined.

n is an integer of 1 or larger, preferably an integer of 1 to 5.

m is an integer of 2 or larger, preferably an integer of 2 to 11, more preferably 2 to 8.

Z represents a coupling agent residue. In this context, the coupling agent residue means a residue after coupling by a coupling agent for use in coupling the polymer block A and the polymer block (B3) between the polymer block A and the polymer block A, between the polymer block (B3) and the polymer block (B3), or between the polymer block A and the polymer block (B3).

Examples of the coupling agent include, but are not limited to, polyhalogen compounds and acid esters mentioned later.

When the polymer block A is a copolymer of a vinyl aromatic compound and another monomer unit, the vinyl aromatic compound in the polymer block A may be uniformly distributed or may be distributed in a tapered pattern. There may exist a plurality of uniformly distributed moieties and/or a plurality of moieties distributed in a tapered pattern.

In the polymer block A, a plurality of moieties differing in the content of the vinyl aromatic compound may coexist with each other.

The vinyl aromatic compound in the polymer block (B3) may be uniformly distributed or may be distributed in a tapered pattern. There may exist a plurality of uniformly distributed moieties and/or a plurality of moieties distributed in a tapered pattern as the vinyl aromatic compound. In the polymer block (B3), a plurality of moieties differing in the content of the vinyl aromatic compound may coexist with each other.

The content of all vinyl aromatic compounds in the hydrogenated copolymer (b) is preferably 30 mass % to 90 mass %, more preferably 35 to 80 mass %, further preferably 40 to 70 mass %.

The content of the conjugated diene compound in the hydrogenated copolymer (b) is preferably 10 mass % to 70 mass %, more preferably 20 to 65 mass %, further preferably 30 to 60 mass %.

When the content of all vinyl aromatic compounds in the hydrogenated copolymer (b) is 30 mass % or more, a resin composition containing the hydrogenated copolymer of the present embodiment is excellent in abrasion resistance. When the content of all vinyl aromatic compounds is 90 mass % or less, a polypropylene resin composition containing the hydrogenated copolymer of the present embodiment is excellent in low-temperature mechanical characteristics.

The content of all vinyl aromatic compounds in the hydrogenated copolymer (b) can be calculated from absorption intensity at a wavelength of 262 nm using an ultraviolet spectrophotometer by a method described in Examples mentioned later.

The content of the vinyl aromatic compound in the hydrogenated polymer block (B3) in the hydrogenated copolymer (b) is 20 to 90 mass %. The upper limit of the content is more preferably 85 mass %, further preferably 80 mass %.

The lower limit of the content is preferably 30 mass %, more preferably 35 mass %, further preferably 40 mass %.

When the content of the vinyl aromatic compound in the hydrogenated copolymer (B3) is 20 mass % or more, the advantage is obtained that a resin composition containing the hydrogenated copolymer of the present embodiment and a polypropylene resin or a rubber-like polymer is excellent in abrasion resistance. When the content of the vinyl aromatic compound is 90 mass % or less, the advantage is obtained that a resin composition is excellent in low-temperature mechanical characteristics.

The content of the vinyl aromatic compound can be adjusted to the numerical range described above by the amount of the vinyl aromatic compound fed during polymerization and can be measured with a nuclear magnetic resonance apparatus (NMR).

The hydrogenated polymer block (B2) constituting the hydrogenated copolymer (a) mentioned above and the hydrogenated polymer block (B3) constituting the hydrogenated copolymer (b) can be discriminated from each other by the content of the vinyl aromatic compound in the copolymer of the conjugated diene compound and the aromatic vinyl compound.

The hydrogenated copolymer (a) mentioned above and the hydrogenated copolymer (b) can thereby be clearly distinguished from each other.

In the hydrogenated copolymer (b), the content of the polymer block A mainly containing a vinyl aromatic compound is preferably 1 mass % to 40 mass %, more preferably 5 mass % to 35 mass %, further preferably 10 mass % to 30 mass %, based on the mass of the hydrogenated copolymer (b).

When the content of the polymer block A in the hydrogenated copolymer (b) is 1 mass % or more, a polypropylene resin composition containing the hydrogenated copolymer of the present embodiment tends to be excellent in CS (compression set (C-set)) and low stickiness. When the content of the block polymer A is 40 mass % or less, a polypropylene resin composition containing the hydrogenated copolymer of the present embodiment tends to be excellent in processability.

The content of the polymer block A in the hydrogenated copolymer (b) can be controlled by adjusting the amount of a monomer added.

The content of the polymer block A in the hydrogenated copolymer (b) can be calculated using the mass of a polymer mainly containing a vinyl aromatic compound (wherein a vinyl aromatic compound having an average degree of polymerization of approximately 30 or less is excluded) determined by a method of oxidatively degrading a pre-hydrogenated copolymer (b') with t-butyl hydroperoxide with osmium tetroxide as a catalyst (method described in I. M. KOLTHOFF, et al., Polym. Sci. 1, 429 (1946)) (hereinafter, referred to as an osmium tetroxide-catalyzed degradation method).

Alternatively, the content of the polymer block A in the hydrogenated copolymer (b) may be measured with a nuclear magnetic resonance apparatus (NMR) by a method described in Y. Tanaka, et al., RUBBER CHEMISTRY and TECHNOLOGY 54, 685 (1981) using a post-hydrogenated copolymer (hydrogenated copolymer (b)).

The NMR method will be specifically described by taking the case of using styrene as a vinyl aromatic compound and 1,3-butadiene as a conjugated diene compound as an example.

$^1$H-NMR was measured using a sample of 30 mg of the hydrogenated copolymer (b) dissolved in 1 g of deuterated chloroform. The content (Ns value) of the polymer block A (in this case, a polystyrene block) was determined from the ratio of the integrated value of chemical shifts 6.9 ppm to 6.3 ppm to the total integrated value.

Block styrene intensity ($b$-$St$ intensity)=(Integrated value of 6.9 ppm to 6.3 ppm)/2

Random styrene intensity ($r$-$St$ intensity)=(Integrated value of 7.5 ppm to 6.9 ppm)−3×($b$-$St$)

Ethylene-butylene intensity ($EB$ intensity)=Total integrated value−3×{($b$-$St$ intensity)+($r$-$St$ intensity)}/8

Polystyrene block content ($Ns$ value) obtained in the NMR method=104×($b$-$St$ intensity)/[104×{($b$-$St$ intensity)+($r$-$St$ intensity)}+56×($EB$ intensity)]

In this context, correlation represented by the following expression holds between the content of the block polymer A (referred to as an "Os value") in the pre-hydrogenated copolymer (b') measured by the osmium tetroxide-catalyzed degradation method and the content of the block polymer A (referred to as a "Ns value") in the hydrogenated copolymer (b) after hydrogenation measured by the NMR method.

$Os$ value=−0.012($Ns$ value)$^2$+1.8($Ns$ value)−13.0

The vinyl bond content before hydrogenation in the conjugated diene compound in the hydrogenated copolymer (b) (vinyl bond content in the conjugated diene compound in the copolymer (b')) is preferably 5 mol % to 95 mol %, more preferably 10 mol % to 85 mol %, further preferably 12 mol % to 80 mol %.

When the vinyl bond content before hydrogenation of the hydrogenated copolymer (b) is 5 mol % or more, a polypropylene resin composition containing the hydrogenated copolymer of the present embodiment is excellent in the compatibility of the hydrogenated copolymer with a polypropylene resin.

The vinyl bond moiety before hydrogenation becomes ethylene bonded to the backbone after hydrogenation. This structure is similar to that of polypropylene containing methyl as a side chain bonded to the backbone. Therefore, a larger vinyl bond content before hydrogenation is considered to increase the compatibility therebetween and render their SP values (solubility parameters) closer to each other.

When the vinyl bond content before hydrogenation is 95 mol % or less, a polypropylene resin composition containing the hydrogenated copolymer of the present embodiment tends to be excellent in low stickiness and processability.

In the present embodiment, the vinyl bond content refers to the total content (which is a 1,2-vinyl bond content in the case of using 1,3-butadiene as conjugated diene, and a 3,4-vinyl bond content in the case of using isoprene as conjugated diene) of a 1,2-vinyl bond content (conjugated diene moiety incorporated through a 1,2-bond in the polymer) and a 3,4-vinyl bond content (conjugated diene moiety incorporated through a 3,4-bond in the polymer) based on all conjugated diene moieties.

The vinyl bond content based on pre-hydrogenated conjugated diene can be measured using a nuclear magnetic resonance apparatus (NMR). A microstructure (ratios of cis, trans, and vinyl) derived from a conjugated diene compound monomer unit in the hydrogenated copolymer (b) can be arbitrarily controlled by use of a polar compound or the like mentioned later.

The hydrogenated copolymer (a) preferably has one or more tan δ peaks at −20° C. or higher and one or more tan δ peaks at lower than −20° C. in viscoelasticity measurement (1 Hz).

The hydrogenated copolymer (b) preferably has only one tan δ peak at −35° C. or higher and has no peak at lower than −35° C. in viscoelasticity measurement (1 Hz).

The hydrogenated copolymer (a) and the hydrogenated copolymer (b) can thereby be clearly distinguished from each other.

The tan δ peak temperature of the hydrogenated copolymer (b) can be controlled by adjusting the ratio between the vinyl aromatic compound and the conjugated diene compound in the hydrogenated polymer block (B3).

The tan δ peak temperature of the hydrogenated copolymer (b) tends to be elevated with increase in the content of the aromatic vinyl compound in the hydrogenated polymer block (B3) and tends to be lowered with decrease therein.

The tan δ peak temperature of the hydrogenated copolymer (b) is more preferably −30° C. or higher, further preferably −20° C. or higher.

When the hydrogenated copolymer (b) has only one tan δ peak at −35° C. or higher, the advantage is obtained that a resin composition containing the hydrogenated copolymer of the present embodiment is excellent in abrasion resistance and balance among characteristics.

(Mass Ratio Between Hydrogenated Copolymer (a) and Hydrogenated Copolymer (b))

In the hydrogenated copolymer of the present embodiment, the mass ratio (a)/(b) of the content of the hydrogenated copolymer (a) to the content of the hydrogenated copolymer (b) is 5/95 to 95/5, preferably 5/95 to 70/30, more preferably 5/95 to 60/40, from the viewpoint of the abrasion resistance, low-temperature mechanical characteristics, and balance among characteristics of a resin composition.

(Methods for Producing Hydrogenated Copolymer (a) and Hydrogenated Copolymer (b))

Examples of the methods for producing the hydrogenated copolymer (a) and the hydrogenated copolymer (b) include, but are not limited to, methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 51-49567, and Japanese Patent Laid-Open No. 59-166518.

The pre-hydrogenated copolymer is obtained by, for example, but not limited to, a method of performing living anion polymerization using a polymerization initiator such as an organic alkali metal compound and using predetermined monomers in a hydrocarbon solvent.

Examples of the hydrocarbon solvent include, but are not particularly limited to: aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

An organic alkali metal compound generally known to have anion polymerization activity against the conjugated diene compound and the vinyl aromatic compound can be used as the polymerization initiator.

Examples thereof include aliphatic hydrocarbon alkali metal compounds having 1 to 20 carbon atoms, aromatic hydrocarbon alkali metal compounds having 1 to 20 carbon atoms, and organic amino alkali metal compounds having 1 to 20 carbon atoms.

Examples of the alkali metal contained in the polymerization initiator include, but are not limited to, lithium, sodium, and potassium.

One or two or more alkali metals may be contained in one molecule.

Examples of the polymerization initiator include, but are not limited to, n-propyllithium, n-butyllithium, sec-butyllithium, tert-butyllithium, n-pentyllithium, n-hexyllithium, benzyllithium, phenyllithium, tolyllithium, reaction products of diisopropenylbenzene and sec-butyllithium, and reaction products of divinylbenzene, sec-butyllithium, and a small amount of 1,3-butadiene.

Alternatively, siloxy group-containing alkyllithiums such as 1-(t-butoxy)propyllithium disclosed in U.S. Pat. No. 5,708,092 and a lithium compound obtained by inserting one to several molecules of an isoprene monomer for improvement in solubility thereof, and 1-(t-butyldimethylsiloxy)hexyllithium disclosed in U.K. Patent No. 2,241,239, amino group-containing alkyllithiums disclosed in U.S. Pat. No. 5,527,753, and aminolithiums such as lithium diisopropylamide and lithium hexamethyldisilazide may be used.

The amount of the lithium compound used as the polymerization initiator depends on the molecular weight of the block copolymer of interest. In general, 0.01 to 0.5 phm (parts by mass per 100 parts by mass of monomers) can be used. The amount of the lithium compound used as the polymerization initiator is preferably 0.03 to 0.3 phm, more preferably 0.05 to 0.15 phm.

In the copolymerization of the conjugated diene compound and the vinyl aromatic compound with the organic alkali metal compound as a polymerization initiator, a tertiary amine compound or an ether compound can be added as a vinyl bond content adjuster in order to adjust the vinyl bond content (1,2-bond or 3,4-bond content) attributed to the conjugated diene compound to be incorporated in the copolymer or to adjust the random copolymerizability of the conjugated diene compound and the vinyl aromatic compound.

Examples of the tertiary amine compound as the vinyl bond adjuster include, but are not particularly limited to, compounds represented by the following formula:

$$R_1R_2R_3N$$

wherein each of $R_1$, $R_2$, and $R_3$ is a hydrocarbon group having 1 to 20 carbon atoms or a hydrocarbon group having a tertiary amino group.

Examples of such a tertiary amine compound include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine, and N,N'-dioctyl-p-phenylenediamine. Among them, N,N,N',N'-tetramethylethylenediamine is preferred.

A linear ether compound, a cyclic ether compound, or the like can be used as the ether compound as the vinyl bond adjuster.

Examples of the linear ether compound include, but are not limited to, dimethyl ether, diethyl ether, diphenyl ether, dialkyl ether compounds of ethylene glycol such as ethylene glycol dimethyl ether, ethylene glycol diethyl ether, and ethylene glycol dibutyl ether, and dialkyl ether compounds of diethylene glycol such as diethylene glycol dimethyl ether, diethylene glycol diethyl ether, and diethylene glycol dibutyl ether.

Examples of the cyclic ether compound include, but are not limited to, tetrahydrofuran, dioxane, 2,5-dimethyloxolane, 2,2,5,5-tetramethyloxolane, 2,2-bis(2-oxolanyl)propane, and alkyl ether of furfuryl alcohol.

The amount of the tertiary amine compound or the ether compound used is preferably 0.1 to 4 (mol/mol of alkali metal), more preferably 0.2 to 3 (mol/mol of alkali metal), based on the polymerization initiator of the organic alkali metal compound.

In the production process of the hydrogenated copolymer (a) or (b), sodium alkoxide may be allowed to coexist for copolymerization.

Examples of the sodium alkoxide include, but are not limited to, compounds represented by the formula given below. Particularly, sodium alkoxide having an alkyl group having 3 to 6 carbon atoms is preferred, and sodium t-butoxide and sodium t-pentoxide are more preferred.

NaOR wherein R is an alkyl group having 2 to 12 carbon atoms.

The amount of the sodium alkoxide used in the polymerization step for the hydrogenated copolymer (a) or (b) is preferably 0.01 or more and less than 0.1 (sodium alkoxide/tertiary amine compound or ether compound molar ratio), more preferably 0.01 or more and less than 0.08 (molar ratio), further preferably 0.03 or more and less than 0.08 (molar ratio), furthermore preferably 0.04 or more and less than 0.06 (molar ratio), based on the vinyl bond content adjuster (tertiary amine compound or ether compound).

When the amount of the sodium alkoxide falls within this range, a copolymer that has a copolymer block containing a conjugated diene compound having a high vinyl bond content, and a polymer block mainly containing a vinyl aromatic compound having a narrow molecular weight distribution, has a narrow molecular weight distribution, and has high strength tends to be able to be produced at a high rate of production.

The polymerization method for copolymerizing the conjugated diene compound and the vinyl aromatic compound with the organic alkali metal compound as a polymerization initiator is not particularly limited and may be batch polymerization, continuous polymerization, or a combination thereof.

The polymerization temperature is not particularly limited and is usually 0 to 180° C., preferably 30 to 150° C.

The time required for polymerization differs depending on conditions and is usually within 48 hours, preferably 0.1 to 10 hours.

The polymerization is preferably performed in an inert gas (e.g., nitrogen gas) atmosphere.

The polymerization pressure is not particularly limited as long as the pressure can fall within a range sufficient for maintaining the monomers and a solvent in a liquid phase in the polymerization temperature range described above.

Coupling reaction may be further performed by adding a necessary amount of a di- or higher functional coupling agent at the completion of polymerization.

The di- or higher functional coupling agent is not particularly limited, and a coupling agent known in the art can be used.

Examples of the difunctional coupling agent include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the tri- or higher multifunctional coupling agents include, but are not limited to: tri- or higher hydric polyalcohols; polyvalent epoxy compounds such as epoxidized soybean oil and diglycidyl bisphenol A; silicon halide compounds represented by the general formula R1(4−n)SiX$_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride.

Alternatively, dimethyl carbonate, diethyl carbonate, or the like may be used as a di- or higher functional coupling agent.

The hydrogenated copolymer (a) or (b) may be obtained through the addition reaction of a modifying agent that forms a functional group-containing atomic group to the living end of the block copolymer obtained by the method as mentioned above.

Examples of the functional group-containing atomic group include, but are not limited to, atomic groups containing at least one functional group selected from the group consisting of a hydroxy group, a carbonyl group, a thiocarbonyl group, an acid halide group, an acid anhydride group, a carboxyl group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilicon group, a tin halide group, an alkoxytin group, and a phenyltin group.

Examples of the modifying agent that forms a functional group-containing atomic group include, but are not limited to, tetraglycidyl-m-xylenediamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, and N-methylpyrrolidone.

The amount of the modifying agent added is preferably 0.01 to 20 parts by mass, more preferably 0.1 to 15 parts by mass, further preferably 0.3 to 10 parts by mass, per 100 parts by mass of the block copolymer before modification.

The addition reaction temperature of the modifying agent is preferably 0 to 150° C., more preferably 20 to 120° C.

The time required for modification reaction differs depending on modification reaction conditions and is preferably within 24 hours, more preferably 0.1 to 10 hours.

The hydrogenation catalyst for use in the production of the hydrogenated copolymer (a) or (b) is not particularly limited, and, for example, a hydrogenation catalyst described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, or Japanese Patent Publication No. 2-9041 can be used.

Preferred examples of the hydrogenation catalyst include titanocene compounds and mixtures of the titanocene compounds with reducing organometallic compounds.

Examples of the titanocene compound include, but are not particularly limited to, compounds described in Japanese Patent Laid-Open No. 8-109219 and specifically include compounds having at least one or more ligands having a (substituted) cyclopentadienyl structure (e.g., bis(cyclopentadienyl)titanium dichloride and mono(pentamethylcyclopentadienyl)titanium trichloride), an indenyl structure, or a fluorenyl structure.

Examples of the reducing organometallic compounds include, but are not particularly limited to, organic alkali metal compounds such as organolithium, organomagnesium compounds, organoaluminum compounds, organoboron compounds, and organozinc compounds.

The reaction temperature of the hydrogenation reaction is usually 0 to 200° C., preferably 30 to 150° C.

The pressure of hydrogen for use in the hydrogenation reaction is preferably 0.1 to 15 MPa, more preferably 0.2 to 10 MPa, further preferably 0.3 to 5 MPa.

The reaction time of the hydrogenation reaction is usually 3 minutes to 10 hours, preferably 10 minutes to 5 hours.

The hydrogenation reaction can employ a batch process or a continuous process, or a combination thereof.

If necessary, catalyst residues may be removed from the reaction solution after the completion of hydrogenation reaction.

Examples of the method for separating the hydrogenated copolymer from a solvent include, but are not limited to, a method of precipitating and recovering the hydrogenated copolymer by the addition of a polar solvent, such as acetone or an alcohol, which serves as a poor solvent to the hydrogenated copolymer, to the solution of the hydrogenated copolymer, a method of adding the solution of the hydrogenated copolymer into hot water with stirring and removing the solvent by steam stripping to recover the hydrogenated copolymer, and a method of distilling off the solvent by directly heating the solution of the hydrogenated copolymer.

The degree of hydrogenation of aliphatic double bonds derived from the conjugated diene compound in the hydrogenated copolymer (a) or (b) is preferably 70% or more, more preferably 80% or more, further preferably 90% or more.

When the degree of hydrogenation is 70% or more, reduction in performance such as mechanical strength ascribable to the thermal deterioration (oxidative deterioration) of a thermoplastic elastomer composition containing the hydrogenated copolymer of the present embodiment can be suppressed because the thermal deterioration (oxidative deterioration) of the hydrogenated copolymer of the present embodiment can be suppressed.

When the degree of hydrogenation is 80% or more, much better weather resistance can be obtained. Though there is no upper limit value of the degree of hydrogenation, the degree of hydrogenation is preferably 100% or less, more preferably 99% or less.

In this context, the degree of hydrogenation refers to the ratio of hydrogenated aliphatic double bonds to aliphatic double bonds based on a conjugated diene compound monomer unit before hydrogenation in the hydrogenated copolymer.

The degree of hydrogenation can be controlled, for example, by adjusting the amount of the catalyst during hydrogenation. The hydrogenation rate can be controlled, for example, by the amount of the catalyst, the amount of hydrogen fed, pressure and temperature at the time of hydrogenation.

The degree of hydrogenation of (aromatic) double bonds based on the vinyl aromatic compound in the hydrogenated copolymer is not particularly limited and is preferably 50% or less, more preferably 30% or less, further preferably 20% or less. In this context, the degree of hydrogenation of aromatic double bonds refers to the ratio of hydrogenated double bonds to aromatic double bonds before hydrogenation.

The degree of hydrogenation can be measured using a nuclear magnetic resonance apparatus (NMR).

The hydrogenated copolymer of the present embodiment may contain an antioxidant on the surface and/or in the inside thereof, for example, by a method such as the addition of the antioxidant during production.

The resin composition of the present embodiment mentioned later may also be supplemented with the antioxidant given below.

Examples of the antioxidant include, but are not limited to, phenol antioxidants, phosphorus antioxidants, sulfur antioxidants, and amine antioxidants.

Specific examples thereof include 2,6-di-t-butyl-4-methylphenol, n-octadecyl-3-(4'-hydroxy-3',5'-di-t-butyl-phenyl) propionate, tetrakis-[methylene-3-(3',5'-di-t-butyl-4'-hydroxyphenyl)propionate]methane], tris-(3,5-di-t-butyl-4-hydroxybenzyl)isocyanurate, 4,4'-butylidene-bis-(3-methyl-6-t-butylphenol), 3,9-bis[2-{3-(3-t-butyl-4-hydroxy-5-methylphenyl)propionyloxy}-1,1-dimethylethyl]-2,4,8,10-tetraoxaspiro[5,5]undecane, triethylene glycol-bis[3-(3-t-butyl-5-methyl-4-hydroxyphenyl)propionate], 1,6-hexanediol-bis-[3-(3,5-di-t-butyl-4-hydroxyphenyl) propionate], 2,4-bis-(n-octylthio)-6-(4-hydroxy-3,5-di-t-butylanilino)1,3,5-triazine, pentaerythritil-tetrakis[3-(3,5-di-t-butyl-4-hydroxyphenyl)propionate], 2,2-thiodiethylenebis[3-(3,5-di-t-butyl-4-hydroxyphenyl) propionate], N,N'-hexamethylenebis(3,5-di-t-butyl-4-hydroxy-hydrocinnamide), 3,5-di-t-butyl-4-hydroxybenzyl phosphonate-diethyl ester, 1,3,5-trimethyl-2,4,6-tris(3,5-di-t-butyl-4-hydroxybenzyl)benzene, a mixture of calcium bis (ethyl 3,5-di-t-butyl-4-hydroxybenzylphosphonate) and polyethylene wax (50%), octylated diphenylamine, 2,4-bis [(octylthio)methyl]-o-cresol, isooctyl-3-(3,5-di-t-butyl-4-hydroxyphenyl)propionate, butyric acid, 3,3-bis(3-t-butyl-4-hydroxyphenyl)ethylene ester, 1,1,3-tris-(2-methyl-4-hydroxy-5-t-butylphenyl)butane, 1,3,5-tris(4-t-butyl-3-hydroxy-2,6-dimethylbenzyl)isocyanurate, 2-t-butyl-6-(3'-t-butyl-5'-methyl-2'-hydroxybenzyl)-4-methylphenylacrylate, and 2-[1-(2-hydroxy-3,5-di-t-pentylphenyl)-ethyl]-4,6-di-t-pentylphenyl acrylate.

The hydrogenated copolymer (a) or (b) may be pelletized.

Examples of the pelletization method include: a method of extruding the hydrogenated copolymer (a) or (b) into strands from a single- or twin-screw extruder, and cutting the strands in water with a rotary blade installed on the foreside of a die portion (underwater cut); a method of extruding the hydrogenated copolymer into strands from a single- or twin-screw extruder, and water-cooling or air-cooling the strands, followed by cutting with a strand cutter; and a method of melt-kneading the hydrogenated copolymer using an open roll or a Banbury mixer, then molding the melt-kneaded product into sheets using a roll, and further cutting the sheets into strips, followed by cutting into cubic pellets with a pelletizer.

The size or shape of the pellets of the hydrogenated copolymer (a) or (b) is not particularly limited.

If necessary, the pellets of the hydrogenated copolymer (a) or (b) may be blended with a pellet anti-blocking agent for the purpose of preventing pellet blocking.

Examples of the pellet anti-blocking agent include, but are not limited to, calcium stearate, magnesium stearate, zinc stearate, polyethylene, polypropylene, ethylenebisstearyl-amide, talc, and amorphous silica.

The amount of the pellet anti-blocking agent blended is preferably 500 to 6000 ppm, more preferably 1000 to 5000 ppm, based on each of the hydrogenated copolymers (a) and (b). The pellet anti-blocking agent is preferably blended so as to be attached to pellet surface, and may be contained inside the pellets to some extent.

The weight-average molecular weight of the hydrogenated copolymer (a) or (b) is preferably 5,0000 to 500,000, more preferably 80,000 to 450,000, further preferably 100,000 to 400,000.

When the weight-average molecular weight of the hydrogenated copolymer (a) or (b) is 50,000 or larger, the pellets tend to have favorable handleability (blocking resistance). When the weight-average molecular weight of the hydrogenated copolymer (a) or (b) is 500,000 or smaller, sufficient fluidity and molding processability tend to be obtained.

The molecular weight distribution (Mw/Mn) of the hydrogenated copolymer (a) or (b) is preferably 1.01 to 8.0, more preferably 1.01 to 6.0, further preferably 1.01 to 5.0. When the molecular weight distribution falls within the range described above, more favorable molding processability tends to be obtained.

The shape of the molecular weight distribution of the hydrogenated copolymer (a) or (b) measured by GPC is not particularly limited and may have a polymodal molecular weight distribution with two or more peaks or may have a monomodal molecular weight distribution with one peak.

The weight-average molecular weight (Mw) and molecular weight distribution [Mw/Mn; ratio of the weight-average molecular weight (Mw) to the number-average molecular weight (Mn)] of the hydrogenated copolymer (a) or (b) can be determined by a method described in Examples mentioned later on the basis of the molecular weight of a chromatogram peak in gel permeation chromatography (GPC) measurement using a calibration curve determined from the measurement of commercially available standard polystyrene (created by using the peak molecular weight of standard polystyrene).

[Resin Composition]

The resin composition of the present embodiment contains the hydrogenated copolymer of the present embodiment containing the hydrogenated copolymers (a) and (b) mentioned above and a polypropylene resin (c).

(Polypropylene Resin (c))

Homopolypropylene as well as random polypropylene or block polypropylene can be used as the polypropylene resin (c).

In this context, the term "random" in the random polypropylene means that in a copolymer of propylene and monomers other than propylene, the monomers other than propylene are randomly incorporated in the propylene chain and are not substantially linked to each other.

The random polypropylene is not particularly limited as long as the content of the propylene unit is less than 99 mass %, i.e., monomers other than propylene are contained in an amount of more than 1 mass %.

Examples of the random polypropylene include random copolymers of propylene and ethylene and random copolymers of propylene and α-olefin having 4 to 20 carbon atoms.

Examples of the α-olefin include, but are not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. α-Olefin having 2 to 8 carbon atoms is preferred. Examples thereof include ethylene, 1-butene, 3-methyl-1-butene, 1-hexene, and 4-methyl-1-pentene.

Such α-olefin can be used singly or in combination of two or more thereof. The homopolypropylene or the random polypropylene can also be used singly or in combination of two or more thereof.

In the resin composition of the present embodiment, the mass ratio (a)/(b) of the content of the hydrogenated copolymer (a) to the content of the hydrogenated copolymer (b) is in the range of 5/95 to 95/5. (a)/(b)=5/95 to 90/10 is preferred from the viewpoint of the abrasion resistance, low-temperature mechanical characteristics, and balance among characteristics of the resin composition containing the polypropylene resin (c). (a)/(b)=5/95 to 80/20 is more preferred, and (a)/(b)=5/95 to 70/30 is further preferred, from the viewpoint of the low stickiness and processability of the resin composition.

When (a)+(b) is defined 100 mass %, 95 mass % or less of the hydrogenated copolymer (a) is preferred from the viewpoint of the low stickiness of the resulting resin composition and 95 mass % or less of the hydrogenated copolymer (b) is preferred from the viewpoint of processability.

The mass ratio of the content of the polypropylene resin (c) to the contents of the hydrogenated copolymer (a) and the hydrogenated copolymer (b) [(c)/((a)+(b))] is preferably in the range of 95/5 to 5/95, more preferably 90/10 to 10/90, further preferably 85/15 to 15/85, from the viewpoint of the abrasion resistance, low-temperature mechanical characteristics, low stickiness, and processability, and balance among characteristics of the resin composition of the present embodiment.

When (a)+(b)+(c) is defined as 100 mass %, the content of the polypropylene resin (c) is preferably 5 mass % or more from the viewpoint of the mechanical strength of the resin composition of the present embodiment and is preferably 95 mass % or less from the viewpoint of low-temperature characteristics.

The resin composition of the present embodiment may be used in combination with other additives according to required performance. Examples of the additives include, but are not particularly limited to, lubricants, flame retardants, stabilizers, colorants, pigments, antioxidants, antistatic agents, dispersants, flow facilitators, mold release agents such as stearic acid metal salts, silicone oil, mineral oil softeners, synthetic resin softeners, copper inhibitors, cross-linking agents, and nucleating agents.

(Method for Producing Resin Composition)

Examples of the method for producing the resin composition of the present embodiment include a method of dry-blending the hydrogenated copolymer (a), the hydrogenated copolymer (b) and the polypropylene resin (c), and optionally other components in amounts appropriate for the characteristics of each component, and a method of preparing the resin composition with an apparatus that is applied to the mixing of usual polymer materials.

Examples of the mixing apparatus therefor include, but are not limited to, kneading apparatuses such as Banbury mixers, Labo Plastomill, single-screw extruders, and twin-screw extruders. A melt kneading method with an extruder is preferred from the viewpoint of productivity and good kneadability.

The melting temperature at the time of kneading can be appropriately set and is usually in the range of 130 to 300° C., preferably in the range of 150 to 250° C.

[Molded Article]

The molded article of the present embodiment is a molded article of the resin composition of the present embodiment mentioned above.

Examples of the molded article include sheet-shaped molded articles (sheets and films), tubes, bags, medical molded articles, for example, medical tubes and medical films, automobile members, for example, automobile interior skin materials, medical infusion bags, and packaging materials, for example, food packaging materials and apparel packaging material, though the molded article of the present embodiment is not limited thereto.

The molded article of the present embodiment can be prepared by molding according to a method mentioned below.

The resin composition of the present embodiment can be molded by softening or melting under heat.

The molding can be performed by use of a conventional molding method known in the art, for example, compression molding, injection molding, gas-assisted injection molding, hollow molding, sheet molding, rotational molding, lamination molding, calendaring, vacuum molding, heat molding, and extrusion molding.

One of these molding methods may be used alone, or two or more thereof may be used in combination. Among them, injection molding is preferred from the viewpoint of productivity.

Examples of the molding method for tubes include, but are not particularly limited to, a method of adding the resin composition of the present embodiment to an extruder, and extruding this resin composition into a tubular shape through a die, followed by water cooling or air cooling to prepare a tube.

A single-screw or multi-screw extruder can be used as the extruder, and a multi-layer tube can also be formed by multi-layer extrusion using a plurality of extruders. Alternatively, the tube may be formed directly from an extruder for producing the resin composition containing the polypropylene resin (c).

The molded article tube may be prepared as a multi-layer tube by lamination with an additional polymer without inhibiting the object of the present embodiment. One of such additional polymers may be used alone, or two or more thereof may be used in combination. The layers of the multi-layer tube may differ in type from each other.

The layer consisting of the additional polymer in the tube having such a multi-layer structure may be an innermost layer, an intermediate layer, or an outermost layer according to the desired performance to be imparted.

A reinforcing yarn braid or a helical reinforcing body can be wrapped around the tube and prepared as a pressure-resistant tube (hose) in order to improve pressure resistance, etc. while maintaining flexibility by suppressing increase in thickness.

The reinforcing yarn braid is disposed in the inside or between layers in the thickness direction, and can employ vinylon, polyamide, polyester, aramide fiber, carbon fiber, metal wire, or the like. The helical reinforcing body is disposed at the outer circumference and can employ a metal, a plastic, or the like.

Examples of the method for producing the sheet-shaped molded article include, but are not particularly limited to, a T-die method and an inflation method as extrusion molding methods of adding the resin composition to an extruder.

For example, usual air-cooling inflation molding, air-cooling two-stage inflation molding, high-speed inflation molding, or water-cooling inflation molding can be adopted as the inflation molding.

Also, a blow molding method such as direct blow or injection blow, or a press molding method can be adopted.

A single-screw or multi-screw extruder can be used as the extruder. Also, a multi-layer sheet can be formed by multi-layer extrusion using a plurality of extruders.

Alternatively, the sheet may be formed directly from an extruder for producing the resin composition.

The sheet-shaped molded article may be prepared as a single-layer sheet or may be prepared as a multi-layer sheet by lamination with an additional polymer without impairing the spirit of the present embodiment. Examples of such an additional polymer include, but are not limited to: olefin polymers such as polypropylene, polyethylene, ethylene-propylene copolymer rubber (EPM), and ethylene-propylene-non-conjugated diene copolymer rubber (EPDM); polyester polymers such as polyester elastomers, polyethylene terephthalate, and polybutylene terephthalate; polyamide resins such as polyamide 6, polyamide 6•6, polyamide 6•10, polyamide 11, polyamide 12, and polyamide 6•12; acrylic resins such as methyl polyacrylate and methyl polymethacrylate; polyoxymethylene resins such as polyoxymethylene homopolymers and polyoxymethylene copolymers; styrene resins such as styrene homopolymers, acrylonitrile-styrene resins, and acrylonitrile-butadiene-styrene resins; polycarbonate resins; styrene elastomers such as styrene-butadiene copolymer rubber and styrene-isoprene copolymer rubber, and hydrogenation products and modification products thereof; natural rubber; synthetic isoprene rubber and liquid polyisoprene rubber, and hydrogenation products and modification products thereof; chloroprene rubber; acrylic rubber; butyl rubber; acrylonitrile-butadiene rubber; epichlorohydrin rubber; silicone rubber; fluorocarbon rubber; chlorosulfonated polyethylene; urethane rubber; polyurethane elastomers; polyamide elastomers; polyester elastomers; and soft vinyl chloride resins.

These additional polymers can be used singly or as a mixture of two or more thereof and may be used as a single layer or as a multi-layer laminate that differs in type among the layers.

For the lamination of the resin composition of the present embodiment with the additional polymer, a coextrusion molding method (e.g., a multi-layer T-die method, a multi-layer inflation method, and an extrusion lamination method), a general multi-layer sheet or film molding method (e.g., wet lamination, dry lamination, and press molding), or a blow molding method (e.g., multi-layer injection blow such as coinjection blow, and multi-layer direct blow) can be adopted.

The molded multi-layer laminate may be undrawn or may be drawn uniaxially or biaxially.

The bag refers to a pouched molded article that can be formed from the sheet-shaped molded article.

Examples of the bag include bags for food packaging, bags for apparel packaging, medical bags, for example, medical infusion bags, and bags for chemical packaging.

The resin composition of the present embodiment is excellent in abrasion resistance, low-temperature mechanical characteristics, and balance among characteristics, as shown in Examples mentioned later, and can be used with no particular limitations on purposes.

By exploiting these characteristics, the resin composition of the present embodiment can be suitably used as a material for a wide range of purposes such as packaging materials for various apparel items, packaging materials for various foods, household sundries packaging materials, industrial material packaging materials, lamination materials for various rubber products, resin products, leather products, and the like, elastic tapes for use in paper diapers and the like, industrial products such as dicing films, adhesive protective films for use in the protection of building materials or steel plates, base materials for adhesive films, trays for meat and fish, packs for vegetables and fruits, sheet products such as frozen food containers, home appliances such as televisions, stereos, and cleaners, materials for automobile interior or exterior parts such as bumper parts, body panels, side seals, and interior (instrumental panel, door trim, airbag cover, etc.) skin materials, road paving materials, waterproof materials, water-shielding sheets, packings for civil engineering, daily goods, leisure goods, toys and games, industrial products, furniture supplies, stationery products such as writing utensils, clear pockets, folders, and file spines, and medical supplies such as infusion bags.

[Thermoplastic Elastomer Composition]

The hydrogenated copolymer of the present embodiment containing the hydrogenated copolymer (a) and the hydrogenated copolymer (b) mentioned above can be combined with a rubber-like polymer to obtain a thermoplastic elastomer composition excellent in abrasion resistance, low-temperature mechanical characteristics and performance balance.

The rubber-like polymer contains a vinyl aromatic compound and preferably contains at least one polymer block mainly containing a vinyl aromatic compound. Also, rubber or an elastomer containing a vinyl aromatic compound, wherein the content of the vinyl aromatic compound is 60 mass % or less is preferred.

Specific examples thereof include styrene butadiene rubber and hydrogenation products thereof (except for the hydrogenated copolymer (a) and the hydrogenated copolymer (b) of the present embodiment), and styrene-butadiene-isoprene block copolymers and hydrogenation products thereof.

The weight-average molecular weight of the rubber-like polymer is preferably 10,000 to 1,500,000, more preferably 20,000 to 1,000,000, further preferably 30,000 to 800,000.

When the weight-average molecular weight of the rubber-like polymer is 10,000 or larger, sufficient mechanical strength tends to be obtained. When the weight-average molecular weight is 1,500,000 or smaller, molding processability tends to be favorable.

The hydrogenated copolymer of the present embodiment containing the hydrogenated copolymer (a) and the hydrogenated copolymer (b) mentioned above can be mixed with a thermoplastic resin other than the hydrogenated copolymer of the present embodiment, and a rubber-like polymer to obtain a thermoplastic elastomer composition excellent in abrasion resistance, low-temperature mechanical characteristics and performance balance.

In the thermoplastic elastomer composition containing the hydrogenated copolymer of the present embodiment, the mass ratio (a)/(b) of the content of the hydrogenated copolymer (a) to the content of the hydrogenated copolymer (b) is in the range of 5/95 to 95/5 and is preferably 5/95 to 90/10, more preferably 5/95 to 80/20, further preferably 5/95 to 70/30, from the viewpoint of the CS (70° C., 100° C.), low stickiness, and balance among characteristics of the thermoplastic elastomer composition.

When (a)+(b) is defined as 100 mass %, the content of the hydrogenated copolymer (a) is preferably 95 mass % or less from the viewpoint of the abrasion resistance of the thermoplastic elastomer composition and the content of the hydrogenated copolymer (b) is preferably 95 mass % or less from the viewpoint of low-temperature mechanical characteristics.

The ratio of the mass sum of the hydrogenated copolymer (a) and the hydrogenated copolymer (b) contained in the thermoplastic elastomer composition to the total mass of the thermoplastic resin and the rubber-like polymer is preferably [(a)+(b)]/(the total of the thermoplastic resin and the rubber-like polymer)=20/80 to 100/0, more preferably 25/75 to 95/5, further preferably 30/70 to 90/10.

When the content in terms of the mass sum of the hydrogenated copolymer (a) and the hydrogenated copolymer (b) falls within the range described above, the thermoplastic elastomer composition is excellent in abrasion resistance, low-temperature mechanical characteristics and performance balance.

When the thermoplastic elastomer composition contains both the thermoplastic resin and the rubber-like polymer, the thermoplastic resin/rubber-like polymer mass ratio is preferably 95/5 to 5/95, more preferably 80/20 to 20/80, further preferably 70/30 to 30/70.

The thermoplastic elastomer composition may contain a softener.

Examples of the softener include paraffin oil, naphthene oil, aromatic oil, paraffin wax, liquid paraffin, white mineral oil, and plant-derived softeners.

Among them, paraffin oil, liquid paraffin, and white mineral oil are more preferred from the viewpoint of the low-temperature characteristics, bleed resistance, etc. of the thermoplastic elastomer composition or a molded article.

The kinematic viscosity at 40° C. of the softener is preferably 500 mm$^2$/sec or lower. The lower limit value of the kinematic viscosity at 40° C. of the softener is not particularly limited and is preferably 10 mm$^2$/sec or higher. When the kinematic viscosity at 40° C. of the softener is 500 mm$^2$/sec or lower, the thermoplastic elastomer composition tends to have more improved fluidity and more improved molding processability. The kinematic viscosity of the softener can be measured by, for example, a testing method using a glass capillary viscometer.

In the thermoplastic elastomer composition, the amount of the softener blended is preferably 5 to 100 parts by mass, more preferably 10 to 80 parts by mass, further preferably 15 to 60 parts by mass, per 100 parts by mass in total of the hydrogenated copolymer of the present embodiment, the thermoplastic resin and the rubber-like polymer.

Thermoplastic elastomer composition may further contain an olefin elastomer.

Examples of the olefin elastomer include α-olefin polymers or copolymers having 2 to 20 carbon atoms, and copolymers of ethylene and unsaturated carboxylic acid or unsaturated carboxylic acid ester.

Examples of the olefin elastomer include, but are not limited to, ethylene-propylene copolymers, ethylene-1-butene copolymers, ethylene-1-hexene copolymers, ethylene-4-methylpentene copolymers, ethylene-1-octene copolymers, propylene homopolymers, propylene-ethylene copolymers, propylene-ethylene-1-butene copolymers, 1-butene homopolymers, 1-butene-ethylene copolymers, 1-butene-propylene copolymers, 4-methylpentene homopolymers, 4-methylpentene-1-propylene copolymers, 4-methylpentene-1-butene copolymers, 4-methylpentene-1-propylene-1-butene copolymers, propylene-1-butene copolymers, ethylene-vinyl acetate copolymers, ethylene-methacrylic acid copolymers, and ethylene-methyl methacrylate copolymers.

The thermoplastic elastomer composition may contain a tackifier.

Examples of the tackifier include, but are not limited to, coumarone-indene resin, p-t-butylphenol-acetylene resin, phenol-formaldehyde resin, xylene-formaldehyde resin, terpene resin, hydrogenated terpene resin, terpene-phenol resin, hydrogenated terpene-phenol resin, aromatic modified terpene resin, aromatic modified hydrogenated phenol resin, styrene resin, alpha-methylstyrene resin, aromatic hydrocarbon resin, aliphatic hydrocarbon resin, aliphatic cyclic hydrocarbon resin, aliphatic-alicyclic petroleum resin, aliphatic-aromatic hydrocarbon resin, hydrogenated modified alicyclic hydrocarbon resin, hydrogenated alicyclic hydrocarbon resin, hydrocarbon tackified resin, polybutene, liquid polybutadiene, cis-1,4-polyisoprene rubber, hydrogenated polyisoprene rubber, liquid polyisoprene rubber, and rosin resin.

The thermoplastic elastomer composition containing the hydrogenated copolymer of the present embodiment may further contain other additives in addition to the components mentioned above without impairing the object of the present invention.

Examples of such additives include heat stabilizers, antioxidants, ultraviolet absorbers, antiaging agents, plasticizers, light stabilizers, crystal nucleating agents, impact modifiers, pigments, lubricants, antistatic agents, flame retardants, flame retardant aids, compatibilizing agents, and tackifiers.

Only one of these additives may be used, or two or more thereof may be used in combination.

(Method for Producing Thermoplastic Elastomer Composition)

The method for producing the thermoplastic elastomer composition is not particularly limited, and the thermoplastic elastomer composition can be produced by a conventional method known in the art.

For example, a melt kneading method using a general mixing machine such as a pressure kneader, a Banbury mixer, an internal mixer, Labo Plastomill, Mix Labo, a single-screw extruder, a twin-screw extruder, a co-kneader, or a multi-screw extruder, or a method of dissolving or dispersing each component, mixing the components, and removing a solvent by heating, is used.

Examples of the shape of the thermoplastic elastomer composition can include, but are not particularly limited to, pellets, sheets, strands, and chips.

After melt kneading, a molded product may be prepared directly.

(Molded Product of Thermoplastic Elastomer Composition)

The thermoplastic elastomer composition containing the hydrogenated copolymer of the present embodiment is excellent in abrasion resistance, low-temperature mechanical characteristics and performance balance. By exploiting these characteristics, the thermoplastic elastomer composition is suitably used in extrusion-molded products, injection-molded products, hollow molded products, compressed air-molded products, vacuum-molded products, high-frequency fusion molded products, overmold molded products, and slush-molded product.

The thermoplastic elastomer composition is particularly suitable for molded products required to have abrasion resistance, low stickiness and performance balance. Examples thereof include packaging materials for foods, drinks, medicaments, precision equipment, and the like, tubes (including catheters), bags, containers, trays, other members, automobile parts and automobile interior skin materials (door trim, instrumental panel, airbag cover, etc.), parts related to home appliances or office automation equipment, industrial parts, household products, and toys and games.

The extrusion-molded product or the injection-molded product mentioned above may be a multi-layer extrusion-molded product or a multi-layer injection-molded product. Such a molded product having the multi-layer configuration may employ the hydrogenated copolymer of the present embodiment or the thermoplastic elastomer composition mentioned above in all the layers or in any one layer or two or more layers.

[Adhesive Film]

The adhesive film of the present embodiment contains the hydrogenated copolymer of the present embodiment mentioned above.

Examples of the adhesive film of the present embodiment include films having a configuration having a base material film and an adhesive layer. The adhesive layer containing the hydrogenated copolymer of the present embodiment on the base material film confers excellent initial tackiness, adhesion increasing properties and feedability, and performance balance thereamong.

The adhesive layer of the adhesive film of the present embodiment may contain a tackifier.

The tackifier can be any resin capable of imparting viscosity to the adhesive layer. Examples thereof include, but are not limited to, tackifiers known in the art such as hydrogenated terpene resin, rosin terpene resin, hydrogenated rosin terpene resin, aromatic modified hydrogenated terpene resin, coumarone resin, phenol resin, terpene phenol resin, hydrogenated terpene phenol resin, aromatic hydrocarbon resin, and aliphatic hydrocarbon resin.

Particularly, hydrogenated terpene resin, aromatic modified hydrogenated terpene resin, hydrogenated terpene phenol resin, and terpene phenol resin are preferred.

Only one of these tackifiers may be used alone, or two or more types thereof may be mixed for use.

For example, a tackifier described in "Compounding Ingredients for Rubbers and Plastics" (edited by Rubber Digest) can also be used.

Use of the tackifier improves adhesive strength.

The content of the tackifier in the adhesive layer of the adhesive film of the present embodiment is preferably 0.5 to 50 mass %, more preferably 1 to 45 mass %, further preferably 5 to 30 mass %, in the adhesive layer.

When the content of the tackifier in the adhesive layer is 50 mass % or less, there is a tendency to be able to effectively prevent increase in adhesion and to be able to further reduce the amount of adhesive residues upon peeling, which is preferred. When the content is 0.5 mass % or more, moderate adhesive strength tends to be obtained.

(Base Material Film)

The material of the base material film constituting the adhesive film is not particularly limited, and any of nonpolar resins and polar resins can be used. Examples of the nonpolar resin include polyethylene, and homo, random and block polypropylenes, and examples of the polar resin include polyester resin such as polyethylene terephthalate and polybutylene terephthalate, polyamide resin, ethylene-vinyl acetate copolymers and hydrolysates thereof, from the viewpoint of performance and price.

The thickness of the base material film is preferably 1 mm or smaller, more preferably 300 μm or smaller, further preferably 10 to 200 μm.

When the thickness of the base material film is 10 μm or larger, an adherend can be sufficiently protected. When the thickness of the base material film is 1 mm or smaller, a practically favorable elastic modulus is obtained and favorable irregularity following properties are obtained. Thus, raising or peeling can be effectively prevented.

(Adhesive Layer)

The adhesive film of the present embodiment has an adhesive layer containing the hydrogenated copolymer of the present embodiment on the base material film. The adhesive layer may contain other materials mentioned later.

In the adhesive layer constituting the adhesive film of the present embodiment, the mass ratio (a)/(b) of the content of the hydrogenated copolymer (a) to the content of the hydrogenated copolymer (b) is in the range of 5/95 to 95/5 and is preferably 5/95 to 90/10, more preferably 5/95 to 80/20, further preferably 5/95 to 70/30, from the viewpoint of the initial tackiness, adhesion increasing properties, and feedability, and performance balance thereamong of the adhesive film. The content of the hydrogenated copolymer (a) is preferably 95 mass % or less from the viewpoint of the adhesion increasing properties and feedability of the adhesive film, and the content of the hydrogenated copolymer (b) is preferably 95 mass % or less from the viewpoint of initial tackiness and feedability.

<Other Materials Contained in Adhesive Layer>

[Hydrogenated Styrene Elastomer]

The adhesive layer of the adhesive film of the present embodiment may further contain a hydrogenated styrene elastomer.

Typical examples of the hydrogenated styrene elastomer include, but are not limited to, styrene-butadiene-styrene (SBS), styrene-isoprene-styrene (SIS), styrene-butadiene random polymers (SBR), styrene-ethylene-butylene-styrene (SEBS) prepared by saturating SBS by hydrogenation, and styrene-ethylene-propylene-styrene (SEPS). In addition, the hydrogenated styrene elastomer may be an elastomer having a structure such as styrene-ethylene-butylene (SEB), styrene-ethylene-propylene (SEP), or a styrene-isobutylene-styrene triblock copolymer (SIBS).

A reactive elastomer prepared by adding various functional groups to the hydrogenated styrene elastomer may be used. Examples of the functional group include, but are not limited to, a hydroxy group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thio-epoxy group, a sulfide group, an isocyanate group, an isothiocyanate group, a silicon halide group, an alkoxysilicon group, a tin halide group, a boronic acid group, a boron-containing group, a boronate base, an alkoxytin group, and a phenyltin group.

[Olefin Resin and Olefin Elastomer]

The adhesive layer of the adhesive film of the present embodiment may further contain an olefin resin and an olefin elastomer.

Examples of the olefin resin and the olefin elastomer include α-olefin polymers or copolymers having 2 to 20 carbon atoms, and copolymers of ethylene and unsaturated carboxylic acid or unsaturated carboxylic acid ester and include, but are not limited to, ethylene-propylene copolymers, ethylene-1-butene copolymers, ethylene-1-hexene copolymers, ethylene-4-methylpentene copolymers, ethylene-1-octene copolymers, propylene homopolymers, propylene-ethylene copolymers, propylene-ethylene-1-butene copolymers, 1-butene homopolymers, 1-butene-ethylene copolymers, 1-butene-propylene copolymers, 4-methylpentene homopolymers, 4-methylpentene-1-propylene copolymers, 4-methylpentene-1-butene copolymers, 4-methylpentene-1-propylene-1-butene copolymers, propylene-1-butene copolymers, ethylene-vinyl acetate copolymers, ethylene-methacrylic acid copolymers, and ethylene-methyl methacrylate copolymers.

[Acrylic Copolymer]

The adhesive layer of the adhesive film of the present embodiment may further contain an acrylic copolymer.

Examples of the acrylic copolymer include, but are not limited to, copolymers of methyl acrylate, ethyl acrylate, methyl methacrylate, or acrylonitrile and vinyl acetate, vinyl chloride, or styrene.

[Softener]

The adhesive layer of the adhesive film of the present embodiment may further contain a softener.

Examples of the softener that can be used include, but are not limited to, mineral oil softeners and synthetic resin softeners.

Examples of the mineral oil softener generally include aromatic hydrocarbon, mixtures of naphthene hydrocarbon and paraffin hydrocarbon.

An oil in which the carbon atoms of paraffin hydrocarbon occupy 50% or more of all carbon atoms is called paraffin oil. An oil in which the carbon atoms of naphthene hydrocarbon occupy 30 to 45% is called naphthene oil. An oil in which the carbon atoms of aromatic hydrocarbon occupy 35% or more is called aromatic oil.

The mineral oil softener is preferably paraffin oil which is a softener for rubber. The synthetic resin softener is preferably polybutene, low-molecular-weight polybutadiene, or the like.

[Antioxidant, Light Stabilizer, Etc.]

The adhesive layer of the adhesive film of the present embodiment may be further supplemented with an antioxidant and a stabilizer such as a light stabilizer.

Examples of the antioxidant include, but are not limited to: hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)] acrylate; sulfur antioxidants such as dilauryl thiodipropionate, lauryl stearyl thiodipropionate, and pentaerythritol-tetrakis(β-lauryl thiopropionate); and phosphorus antioxidants such as tris(nonylphenyl)phosphite and tris(2,4-di-t-butylphenyl)phosphite.

Examples of the light stabilizer include, but are not limited to: benzotriazole ultraviolet absorbers such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

[Pigment, Waxes, Thermoplastic Resin, Natural Rubber, and Synthetic Rubber]

The adhesive layer of the adhesive film of the present embodiment can optionally contain various additives in addition to the materials mentioned above.

Examples of the additives include, but are not limited to: pigments such as colcothar and titanium dioxide; waxes such as paraffin wax, microcrystalline wax, and low-molecular-weight polyethylene wax; polyolefin or low-molecular-weight vinyl aromatic thermoplastic resins such as amorphous polyolefin and ethylene-ethyl acrylate copolymers; natural rubber; and synthetic rubber such as polyisoprene rubber, polybutadiene rubber, styrene-butadiene rubber, ethylene-propylene rubber, chloroprene rubber, acrylic rubber, isoprene-isobutylene rubber, and polypentenamer rubber.

Examples of the synthetic rubber include those described above as well as those described in "Compounding Ingredients for Rubbers and Plastics" (edited by Rubber Digest).

[Saturated Fatty Acid Bisamide]

The adhesive layer of the adhesive film of the present embodiment can contain saturated fatty acid bisamide effective for suppressing increase in adhesion.

Examples of the saturated fatty acid bisamide include, but are not limited to, saturated fatty acid aliphatic bisamide such as ethylene bis(stearamide) (EBSA), methylene bis(stearamide), and hexamethylene bis(stearamide), and saturated fatty acid aromatic bisamide such as m-xylylene bis(stearamide) and N,N'-distearylisophthalamide.

Only one of these saturated fatty acid bisamides may be used alone, or two or more thereof may be used in combination.

A styrene block phase reinforcing agent effective for suppressing increase in adhesion may be further blended into the adhesive layer of the adhesive film of the present embodiment.

Examples of the styrene block phase reinforcing agent include, but are not limited to, styrene compounds such as styrene and α-methylstyrene, p-methylstyrene, p-chlorostyrene, chloromethylstyrene, tert-butylstyrene, p-ethylstyrene, and divinylbenzene as monomer units. Only one of these styrene block phase reinforcing agents may be used alone, or two or more thereof may be used in combination.

<Method for Producing Resin Material Constituting Adhesive Layer of Adhesive Film>

The resin material constituting the adhesive layer of the adhesive film of the present embodiment can be produced by, for example, a method of dry-blending the hydrogenated copolymer (a), the hydrogenated copolymer (b) and other components to be optionally added, or a method of preparing the resin material with an apparatus that is applied to the mixing of usual polymer materials.

Examples of the mixing apparatus include, but are not particularly limited to, kneading apparatuses such as Banbury mixers, Labo Plastomill, single-screw extruders, and twin-screw extruders. Production with a melt kneading method using an extruder is preferred from the viewpoint of productivity and good kneadability.

Particularly, in the case of blending a tackifier into the adhesive layer, the dry blending method described above may be used, or a master batch may be prepared by kneading the tackifier into the hydrogenated copolymer of the present embodiment in advance because the tackifier has strong stickiness, is in a flake form, and is poorly handleable.

The melting temperature at the time of kneading can be appropriately set and is usually in the range of 130 to 300° C., preferably in the range of 150 to 250° C.

The resin material constituting the adhesive layer of the adhesive film may be subjected to foaming treatment in order to achieve reduction in weight, flexibility and an effect of improving adhesion.

Examples of the foaming treatment method include, but are not limited to, chemical methods, physical methods, and use of thermally expansive microballoons.

Air bubbles can be distributed inside the material, for example, by the addition of a chemical foaming agent such as an inorganic foaming agent or an organic foaming agent, a physical foaming agent, or a thermally expansive microballoon. Reduction in weight, flexibility and improvement in adhesion may be achieved by the addition of a hollow filler (already expanded balloon).

(Method for Producing Adhesive Film)

The adhesive film of the present embodiment has an adhesive layer containing the hydrogenated copolymer (a) and the hydrogenated copolymer (b) on the base material film.

Examples of the method for producing the adhesive film of the present embodiment include, but are not particularly limited to, a method of coating the base material film with a solution or a melted product of the resin material constituting the adhesive layer, and a method using a film extruder.

In this context, in the case of using a solution or a melted product of the resin material constituting the adhesive layer, predetermined materials may be mixed to prepare a composition, which is then prepared into a solution or a melted product, or respective solutions or melted products of the materials may be prepared and then mixed.

The coating method with a solution of the resin material is not limited. For example, the resin material is dissolved in a solvent capable of dissolving it. The base material film can be coated with the solution using a coater or the like, and the solvent can be dried off by heating, for example, for production.

Examples of the method for melting the resin material, followed by coating include, but are not limited to, a method of coating the base material film with a melted resin material using a hot melt coater or the like.

In this case, it is preferred to use various base material films having a higher glass transition temperature, melting point or softening point than the coating temperature.

Examples of the method using a film extruder include, but are not limited to, a production method of creating two flows of adhesive layer components including the resin material, and components (e.g., thermoplastic resin) capable of constituting the base material film in a melt co-extruder, i.e., combining a fluid for adhesive layer formation and a fluid for base material film formation in a die opening to form a single fluid, which is then extruded to prepare an adhesive layer combined with a resin film layer.

The method using a film extruder is a method excellent in productivity because the resin material that forms the adhesive layer can also be produced by dry-blending components for the adhesive layer in advance. The adhesive film prepared by extrusion molding tends to be excellent, particularly, in adhesion and adhesion strength.

(Purpose of Adhesive Film)

The adhesive film of the present embodiment can be used as an anti-scratch or anti-stain protective film at the time of processing, delivery or storage of optical molded articles (e.g., light guide plates and prism sheets), synthetic resin plates, metal plates, decorated plywood, painted steel plates, various nameplates, and the like by temporal attachment to the surface of these adherends.

EXAMPLES

Hereinafter, the present invention will be described in detail with reference to specific Examples and Comparative Examples. However, the present invention is not limited by Examples given below.

First, evaluation methods and methods for measuring physical properties applied to Examples and Comparative Examples will be given below.

[Methods for Identifying Structures of Hydrogenated Copolymer (a) and Hydrogenated Copolymer (b) and Methods for Measuring Physical Properties]

((1): Content of all Vinyl Aromatic Compounds (Total Styrene Content))

The content of all vinyl aromatic compounds (mass %) in each of the copolymers (a1) to (a13) and (b1) to (b8) shown in Tables 1 to 3 was calculated from absorption intensity at 262 nm using a pre-hydrogenated copolymer and an ultraviolet spectrophotometer (manufactured by Shimadzu Crop., UV-2450).

Since the content of all vinyl aromatic compound monomer units does not vary between before and after hydrogenation, the content of all vinyl aromatic compound monomer units (styrene monomer units) obtained as to the pre-hydrogenated copolymer was regarded as the content of all vinyl aromatic compound monomer units (total styrene content) of the hydrogenated copolymer.

((2): Polystyrene Block Contents (Os Values) of Hydrogenated Copolymer (a) and Hydrogenated Copolymer (b))

Measurement was performed by the osmium tetroxide-catalyzed degradation method described in I. M. KOLTHOFF, et al., J. Polym. Soi. 1, 429 (1946) using a pre-hydrogenated copolymer.

The degradation of the pre-hydrogenated copolymer employed a solution of 0.1 g of osmic acid in 125 mL of tertiary butanol.

The content of the polystyrene block thus obtained is referred to as an "Os value".

((3): Amount of Vinyl Aromatic Compound in Polymer Block (B1) in Hydrogenated Block Copolymer (a), and Amount of Vinyl Aromatic Compound in Polymer Block (B3) in Hydrogenated Block Copolymer (b))

The hydrogenated block copolymer (a) and the hydrogenated block copolymer (b) were each used as a measurement sample.

The polymer block A mainly containing a vinyl aromatic compound, and the polymer block (B1) consisting of a vinyl aromatic compound and conjugated diene contained in the hydrogenated copolymer (a) were discriminated from each other by the proton nuclear magnetic resonance method ($^1$H-NMR, ECS400 manufactured by JEOL RESONANCE Inc.).

Likewise, the polymer block A mainly containing a vinyl aromatic compound, and the polymer block (B3) consisting of a vinyl aromatic compound and a conjugated diene compound contained in the hydrogenated copolymer (b) were discriminated from each other.

Measurement was performed using deuterated chloroform as a solvent under conditions involving a sample concentration of 50 mg/mL, an observation frequency of 400 MHz, tetramethylsilane used as a chemical shift reference, a pulse delay of 2.904 seconds, the number of scans of 256, and a measurement temperature of 23° C.

In order to calculate the ratio between random and block aromatic vinyl compounds, the integrated value per $^1$H of each bond was calculated from the integrated intensity of signals attributed to aromaticity. Then, the total styrene content was calculated by the method described in the section (1), and a content ratio was calculated.

((4): Vinyl Bond Content of Polymer Block (B2) Mainly Containing Conjugated Diene in Hydrogenated Copolymer (a))

A polymer sampled on a step basis of a polymerization process from a pre-hydrogenated copolymer was used as a measurement subject. The vinyl bond content (1,2-bond content) was measured by the proton nuclear magnetic resonance ($^1$H-NMR) method using a nuclear magnetic resonance apparatus (manufactured by Bruker Corp., DPX-400).

Measurement was performed using deuterated chloroform as a solvent under conditions involving a sample concentration of 50 mg/mL, an observation frequency of 400 MHz, tetramethylsilane used as a chemical shift reference, a pulse delay of 2.904 seconds, the number of scans of 64, a pulse width of 45° C., and a measurement temperature of 26° C.

The vinyl bond content was calculated from the ratio of a 1,2-bond to the total of a 1,4-bond and the 1,2-bond after calculation of the integrated value per $^1$H of each bond was calculated from the integrated intensity of signals attributed to the 1,4-bond and the 1,2-bond.

The vinyl bond content of the polymer block (B2) was calculated on the basis of the amount of the polymer block (B2) fed (content of the polymer block (B2)) during polymerization using a vinyl bond content calculated from a copolymer after the completion of the whole polymerization process (total vinyl bond content including those of the polymer blocks (B1) and (B2)) and a vinyl bond content calculated after the completion of the polymerization process of the polymer block (B1) (vinyl bond content of the polymer block (B1)).

((5): Weight-Average Molecular Weights of Hydrogenated Copolymer (a) and Hydrogenated Copolymer (b))

Measurement was performed using GPC [apparatus: Tosoh HLC8220, column: TSKgel SuperH-RC×2].

Tetrahydrofuran was used as a solvent.

Measurement conditions involved a temperature of 35° C. A weight-average molecular weight based on polystyrene was determined using a calibration curve prepared using commercially available standard polystyrene having a known weight-average molecular weight.

((6): Degrees of Hydrogenation of Hydrogenated Copolymer (a) and Hydrogenated Copolymer (b))

The degree of hydrogenation of each hydrogenated copolymer was measured with a nuclear magnetic resonance apparatus (manufactured by Bruker Corp., DPX-400).

Measurement was performed by proton nuclear magnetic resonance ($^1$H-NMR) using the hydrogenated copolymer serving as a post-hydrogenated copolymer.

Specifically, integrated values of signals derived from residual double bonds at 4.5 to 5.5 ppm and signals derived from hydrogenated conjugated diene were calculated, and the ratio therebetween was calculated.

((7): Viscoelasticity Measurement (Tan δ Peak) of Hydrogenated Copolymer (a) and Hydrogenated Copolymer (b))

Dynamic viscoelastic spectra were measured by the following method, and the peak temperature of loss coefficient tan δ (tan δ peak temperature) was obtained.

First, each hydrogenated copolymer was molded into a sheet having a thickness of 2 mm and then cut into a size of 10 mm in width and 35 mm in length to prepare a sample for measurement.

The sample for measurement was loaded in the twist-type geometry of apparatus ARES (manufactured by TA Instruments, Inc., trade name). Measurement was performed under conditions involving an effective measurement length of 25 mm, a strain of 0.5%, a frequency of 1 Hz, a measurement temperature range from −100° C. to 100° C., and a heating rate of 3° C./min.

[Production of Polypropylene Resin Composition]

Pellets of a polypropylene resin composition were obtained on the basis of the blending ratio (parts by mass) shown below in Tables 4 to 7 by melt kneading using a twin-screw extruder ("TEX-30αII" manufactured by The Japan Steel Works, LTD., cylinder aperture: 30 mm) at a set temperature of 220° C.

A molded article of the polypropylene resin composition (thickness: 2.0 mm, with or without leather grain) was obtained by molding at an injection molding temperature of 220° C. and a mold temperature of 40° C.

The polypropylene resin (component (c)) used was PM801A (PP/manufactured by SunAllomer Ltd.; MFR=15; in Tables 4 to 7, referred to as "h-pp").

The hydrogenated copolymer (a) used was (a1) to (a13) mentioned later, and the hydrogenated copolymer (b) used was (b1) to (b3) and (b5) to (b8) mentioned later.

(Evaluation of Physical Properties of Polypropylene Resin Composition)

((8): Abrasion Resistance and Surface Observation after Abrasion)

Molded article surface (leather grain processed surface) was frictioned with fiction cotton Kanakin No. 3 cotton under a load of 500 g using Gakushin-Type friction tester (manufactured by Tester Sangyo Co., Ltd., model AB-301), and a grain depth was then measured and assessed according to the following criteria depending on a grain depth residual rate (calculated according to (expression 1) given below).

The grain depth was measured with surface roughness meter E-35A manufactured by Tokyo Seimitsu Co., Ltd.

$$\text{Grain depth residual rate (\%)} = \text{(Grain depth after friction)} / \text{(Grain depth before friction)} \times 100 \quad \text{(expression 1)}$$

5: The grain depth residual rate was 80% or more after 10000 times of friction.
4: The grain depth residual rate was less than 80% and 65% or more after 10000 times of friction.
3: The grain depth residual rate was less than 65% and 50% or more after 10000 times of friction.
2: The grain depth residual rate was less than 50% and 25% or more after 10000 times of friction.
1: The grain depth residual rate was less than 25% after 10000 times of friction.

((9): Low-Temperature Mechanical Characteristics (Tensile Elongation (−30° C.))

A tensile test was conducted at −30° C. at a crosshead speed of 500 mm/min with No. 3 dumbbell using a tensile tester with a thermostat bath (MinebeaMitsumi Inc., Tg-5 kN) in accordance with JIS K6251, and breaking elongation was evaluated according to the following criteria.

5: The breaking elongation was 500% or more.
4: The breaking elongation was 400% or more and less than 500%.
3: The breaking elongation was 300% or more and less than 400%.
2: The breaking elongation was 200% or more and less than 300%.
1: The tensile modulus was less than 200%.

((10): Low Stickiness)

Two molded articles (without leather grain) were laminated (top face: 5 cm×8 cm, bottom face: 4 cm×5 cm). Then, a load of 500 g (size: 6 cm×10 cm×1 cm) was placed on the top face and left standing for 60 seconds.

Then, adhesive strength (J) was measured with a tensile tester (MinebeaMitsumi Inc., Tg-5 kN) when the molded articles were peeled by 180° at a rate of 100 mm/min, and evaluated as an index for low stickiness according to the following criteria.

5: The adhesive strength was less than 3 N.
4: The adhesive strength was 3 N or more and less than 5 N.
3: The adhesive strength was 5 N or more and less than 10 N.
2: The adhesive strength was 10 N or more and less than 15 N.
1: The adhesive strength was 15 N or more.

((11): Processability)

A 350 mm wide×0.5 mm thick sheet was prepared by extrusion molding, and its degree of elevation in resin pressure, fish-eye from poor melting, drawdown, surface appearance and shape were observed and comprehensively determined.

5: A level with no practical problems.
4: A usable level, though somewhat improvement was required.
3: A slightly poor level, though improvement was required.
2: A level that evidently required improvement.
1: Impossible to mold.

((12): Viscoelasticity Measurement)

Each hydrogenated copolymer and a polypropylene resin composition containing the hydrogenated copolymer were each press-molded or injection-molded into a sheet having a thickness of 2 mm and then cut into a size of 10 mm in width and 35 mm in length to prepare a sample for measurement.

The sample for measurement was loaded in the twist-type geometry of apparatus ARES (manufactured by TA Instruments, Inc., trade name). Measurement was performed under conditions involving an effective measurement length of 25 mm, a strain of 0.5%, a frequency of 1 Hz, a measurement temperature range from −100° C. to 100° C., and a heating rate of 3° C./min.

((13): Morphology Observation (TEM Observation))

The cross section of an injection-molded article of a polypropylene resin composition was stained with ruthenium tetroxide. Then, an ultrathin section was obtained with a microtome. The ultrathin section was observed under a transmission electron microscope (TEM) at a magnification of ×5000 to ×100000.

((14): Morphology Observation (AFM Observation))

A smooth surface was prepared with a microtome using a molded article (press-molded article or injection-molded article) of a polypropylene resin composition to obtain a sample piece.

The smooth surface of the sample piece was observed under AFM (Bruker Dimension Icon, Peak Force QNM mode/OLTESPA Si single-crystal probe) to obtain an elastic modulus mapping diagram.

[Production of Thermoplastic Elastomer Composition]

Pellets of a thermoplastic elastomer composition were obtained on the basis of the blending ratio (parts by mass) shown below in Tables 8 to 11 by melt kneading using a twin-screw extruder ("TEX-30αII" manufactured by The Japan Steel Works, LTD., cylinder aperture: 30 mm) at a set temperature of 220° C.

A molded article of the thermoplastic elastomer composition (thickness: 2.0 mm, with or without leather grain) was obtained by molding at an injection molding temperature of 220° C. and a mold temperature of 40° C.

The hydrogenated copolymer (a) used was (a1), (a3), (a4), (a5), (a8), (a9), (a12), and (a13) mentioned later, and the hydrogenated copolymer (b) used was (b1), (b4), (b5), (b6), and (b8) mentioned later.

The polypropylene resin used was PM801A (PP/manufactured by SunAllomer Ltd.; MFR=15).

The rubber-like polymer used was a styrene thermoplastic elastomer, Tuftec N504 (styrene content: 32 mass %, manufactured by Asahi Kasei Corp.).

The softener used was paraffin oil, PW-90 (manufactured by Idemitsu Kosan Co., Ltd.). This softener is described as "Paraffin oil" in Tables 8 to 11.

(Evaluation of Physical Properties of Thermoplastic Elastomer Composition)

((15): Abrasion Resistance)

Evaluation was conducted in the same manner as in the section (8).

((16): Compression Set (C-Set))

Compression set (C-set) was measured in accordance with JIS K6262 when a sample was compressed by 25% and left standing for 72 hours under temperature conditions of 70° C. and 100° C.

5: C-set was less than 55%.
4: C-set was 55% or more and less than 60%.
3: C-set was 60% or more and less than 65%.
2: C-set was 65% or more and less than 70%.
1: C-set was 70% or more.

((17): Low-Temperature Mechanical Characteristics (Tensile Elongation (−30° C.))

Evaluation was conducted in the same manner as in the section (9).

((18): Low Stickiness)

Evaluation was conducted in the same manner as in the section (10).

[Production of Adhesive Film]

Polypropylene (PC684S, manufactured by SunAllomer Ltd., MFR (230° C., 2.16 kg load)=6.0 g/10 min) to constitute a base material layer, and hydrogenated copolymers (containing an additional component) to constitute an adhesive layer, blended at the ratio shown in Table 12 given below, were each supplied to an extruder, and both the layers were integrated and coextruded (230° C.) by the T-die coextrusion method to produce an adhesive film having a base material layer thickness of 40 μm and an adhesive layer thickness of 10 μm, which was then wound around a take-up roll.

The additional component used was tackifier P100 (manufactured by Arakawa Chemical Industries, Ltd.).

This tackifier is described in "Arkon P100" in Table 12.

The tackifier used was a hydrogenated styrene elastomer Tuftec H1221 (styrene content: 13 mass %, manufactured by Asahi Kasei Corp.). This tackifier is described as "Tuftec H1221" in Table 12.

The hydrogenated copolymer (a) used was (a1) and (a9) mentioned later, and the hydrogenated copolymer (b) used was (b2), (b3), and (b7) mentioned later.

((19): Initial Tackiness)

A universal tensile and compression tester "Technograph TGE-500N; manufactured by MinebeaMitsumi Inc." was used as a measurement apparatus.

The prepared adhesive film having a width of 25 mm was placed on a PMMA plate (arithmetic average roughness of surface: 0.1 μm), affixed thereto by the rolling of a rubber roll (diameter: 10 cm) having a weight of 2 kg, left at a temperature of 23° C. and a relative humidity of 50% for 30 minutes, and then peeled off by 180 degrees at a peeling rate of 300 mm/min. Initial adhesive strength was measured in accordance with JIS K6854-2 and evaluated according to the following criteria.

3: The initial adhesive strength was 400 (g/25 mm) or more.
2: The initial adhesive strength was 200 (g/25 mm) or more and less than 400 (g/25 mm).
1: The initial adhesive strength was less than 200 (g/25 mm).

((20): Adhesion Increasing Properties)

The prepared adhesive film having a width of 25 mm was placed on a PMMA plate (arithmetic average roughness of surface: 0.1 μm) and further affixed thereto by the rolling of a rubber roll (diameter: 10 cm) having a weight of 2 kg. Then, the sample was stored for 1 hour in an oven having a temperature of 80° C., then further left at a temperature of 23° C. and a relative humidity of 50% for 30 minutes, and then peeled off by 180 degrees at a peeling rate of 300 mm/min. Adhesive strength was measured in accordance with JIS K6854-2.

Adhesion increasing properties were calculated according to the following expression and evaluated according to the following criteria.

Adhesion increasing properties=(Adhesive strength after heating at 80° C. for 1 hour)/(Initial adhesive strength)

3: The adhesion increasing properties were 1.7 or less.
2: More than 1.7 and 2.0 or less.
1: More than 2.0.

((21): Feedability)

The prepared adhesive film wound around a roll was evaluated according to the following upon feeding from the roll.

3: The adhesive film was smoothly fed with small force.
2: The adhesive film was fed without being elongated, though slight force was required.
1: The adhesive layer sticked to the base material layer and thus failed to be fed.

[Production of Hydrogenated Copolymer]

(Preparation of Hydrogenation Catalyst)

The hydrogenation catalyst used in the hydrogenation reaction of a copolymer was prepared by the following method.

To a reaction container purged with nitrogen, 1 L of dried and purified cyclohexane was added, and 100 mmol of bis(cyclopentadienyl)titanium dichloride was added. While the mixture was thoroughly stirred, a n-hexane solution containing 200 mmol of trimethylammonium was added thereto. The resulting mixture was reacted at room temperature for approximately 3 days to obtain a hydrogenation catalyst.

(Hydrogenated Copolymer)

The hydrogenated copolymers (a1) to (a13) and the hydrogenated copolymers (b1) to (b8) were prepared as described below. Their physical properties are shown in Tables 1 to 3 given below.

Production Example 1: Hydrogenated Copolymer (a1)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 25 parts by mass of styrene, and a cyclohexane solution containing 21 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 34 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 25° C. and −30° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a1).

Production Example 2: Hydrogenated Copolymer (a2)

Batch polymerization was performed using a vessel-type reactor (internal capacity: 10 L) equipped with a stirring apparatus and a jacket.

First, a cyclohexane solution containing 7 parts by mass of styrene (concentration: 20 mass %) was added to the reactor.

Next, n-butyllithium at 0.089 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 57 parts by mass of butadiene (concentration: 20 mass %) was added thereto, followed by polymerization at 60° C. for 1 hour.

Next, a cyclohexane solution containing 18 parts by mass of styrene, and a cyclohexane solution containing 14 parts by mass of butadiene (concentration: 20 mass %) were added thereto, followed by polymerization at 70° C. for 45 minutes.

Next, a cyclohexane solution containing 4 parts by mass of styrene was added thereto, followed by polymerization at 70° C. for 20 minutes.

Then, the polymerization reaction was terminated by the addition of methanol.

The copolymer thus obtained had a styrene content of 29 mass %, a polystyrene block content of 11 mass %, a vinyl bond content of 77 mol % in the polymer block (B2), and a weight-average molecular weight of 137,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 15° C. and −32° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a2).

Production Example 3: Hydrogenated Copolymer (a3)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 22 parts by mass of styrene, and a cyclohexane solution containing 24 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 31 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 19° C. and −30° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a3).

Production Example 4: Hydrogenated Copolymer (a4)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 20 parts by mass of styrene, and a cyclohexane solution containing 26 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 29 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 12° C. and −30° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a4).

Production Example 5: Hydrogenated Copolymer (a5)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 35 parts by mass of styrene, and a cyclohexane solution containing 11 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 44 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 39° C. and −28° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a5).

Production Example 6: Hydrogenated Copolymer (a6)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 2.5 mol per mol of n-butyllithium, and sodium-t-pentoxide at 0.08 mol per mol of n-butyllithium were added thereto, followed by polymerization at 70° C. for 20 minutes.

Next, a cyclohexane solution containing 25 parts by mass of styrene, and a cyclohexane solution containing 21 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 34 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 25° C. and −25° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a6).

Production Example 7: Hydrogenated Copolymer (a7)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 25 parts by mass of styrene, and a cyclohexane solution containing 21 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 34 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. The hydrogenation reaction was terminated when the degree of hydrogenation reached 75%.

The obtained hydrogenated copolymer had tan $\delta$ peak temperatures of 25° C. and −38° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a7).

Production Example 8: Hydrogenated Copolymer (a8)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, and N,N,N',N'-tetramethylethylenediamine at 0.85 mol per mol of n-butyllithium were added thereto, followed by polymerization at 70° C. for 20 minutes.

Next, a cyclohexane solution containing 25 parts by mass of styrene, and a cyclohexane solution containing 21 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 34 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan $\delta$ peak temperatures of 25° C. and −35° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a8).

Comparative Production Example 9: Hydrogenated Copolymer (a9)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 0.45 mol per mol of n-butyllithium, and sodium-t-pentoxide at 0.05 mol per mol of n-butyllithium were added thereto, followed by polymerization at 70° C. for 20 minutes.

Next, a cyclohexane solution containing 25 parts by mass of styrene, and a cyclohexane solution containing 21 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The copolymer thus obtained had a styrene content of 34 mass %, a polystyrene block content of 9 mass %, a vinyl bond content of 50 mol % in the polymer block (B2), and a weight-average molecular weight of 146,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan $\delta$ peak temperatures of 22° C. and −50° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a9).

Comparative Production Example 10: Hydrogenated Copolymer (a10)

Batch polymerization was performed using a vessel-type reactor (internal capacity: 10 L) equipped with a stirring apparatus and a jacket.

First, a cyclohexane solution containing 7.5 parts by mass of styrene (concentration: 20 mass %) was added to the reactor.

Next, n-butyllithium at 0.080 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 36 parts by mass of styrene, and a cyclohexane solution containing 49 parts by mass of butadiene (concentration: 20 mass %) were added thereto, followed by polymerization at 70° C. for 1 hour.

Next, a cyclohexane solution containing 7.5 parts by mass of styrene was added thereto, followed by polymerization at 60° C. for 20 minutes.

Then, the polymerization reaction was terminated by the addition of methanol.

The copolymer thus obtained had a styrene content of 51 mass %, a polystyrene block content of 15 mass %, and a weight-average molecular weight of 151,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperature of −14° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a10).

Comparative Production Example 11:
Hydrogenated Copolymer (a11)

Batch polymerization was performed using a vessel-type reactor (internal capacity: 10 L) equipped with a stirring apparatus and a jacket.

First, a cyclohexane solution containing 24 parts by mass of styrene (concentration: 20 mass %) was added to the reactor.

Next, n-butyllithium at 0.072 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 30 minutes.

Next, a cyclohexane solution containing 52 parts by mass of butadiene (concentration: 20 mass %) was added thereto, followed by polymerization at 60° C. for 1 hour.

Next, a cyclohexane solution containing 24 parts by mass of styrene was added thereto, followed by polymerization at 70° C. for 30 minutes.

Then, the polymerization reaction was terminated by the addition of methanol.

The copolymer thus obtained had a styrene content of 48 mass %, a polystyrene block content of 48 mass %, a vinyl bond content of 76 mol % in the polymer block (B2), and a weight-average molecular weight of 165,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 99% and a tan δ peak temperature of −28° C.

Next, octadecyl-3-(3,5-di-t-butyl-4-hydroxyphenyl)propionate was added as a stabilizer at 0.3 parts by mass per 100 parts by mass of the hydrogenated polymer to obtain a hydrogenated copolymer (a11).

Comparative Production Example 12:
Hydrogenated Copolymer (a12)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 17 parts by mass of styrene, and a cyclohexane solution containing 29 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 26 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 9° C. and −30° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a12).

Comparative Production Example 13:
Hydrogenated Copolymer (a13)

Batch polymerization was performed using a vessel-type reactor (internal capacity: 10 L) equipped with a stirring apparatus and a jacket.

First, a cyclohexane solution containing 9 parts by mass of styrene (concentration: 20 mass %) was added to the reactor.

Next, n-butyllithium at 0.084 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 39 parts by mass of styrene, and a cyclohexane solution containing 7 parts by mass of butadiene (concentration: 20 mass %) were added thereto, followed by polymerization at 70° C. for 45 minutes.

Next, a cyclohexane solution containing 45 parts by mass of butadiene was added thereto, followed by polymerization at 60° C. for 1 hour.

Then, the polymerization reaction was terminated by the addition of methanol.

The polymer thus obtained had a styrene content of 48 mass %, a polystyrene block content (Os value) of 9 mass %, a vinyl bond content of 77 mol % in the polymer block (B2), and a weight-average molecular weight of 148,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and tan δ peak temperatures of 49° C. and −30° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (a13).

Production Example 14: Hydrogenated Copolymer (b1)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.084 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 47 parts by mass of styrene, and a cyclohexane solution containing 33 parts by mass of butadiene (concentration: 20 mass %) were added thereto, followed by polymerization at 70° C. for 1 hour.

Next, ethyl benzoate was added at 0.25 mol per mol of n-butyllithium and reacted at 70° C. for 10 minutes.

Then, the polymerization reaction was terminated by the addition of methanol.

The copolymer thus obtained had a styrene content of 67 mass %, a polystyrene block content of 20 mass %, a vinyl bond content of 25% before hydrogenation in the polymer block (B3), and a weight-average molecular weight of 193,000.

The coupling rate determined by a peak area ratio of a GPC curve was 50%.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperatures of 18° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b1).

Production Example 15: Hydrogenated Copolymer (b2)

Batch polymerization was performed using a vessel-type reactor (internal capacity: 10 L) equipped with a stirring apparatus and a jacket.

First, a cyclohexane solution containing 7.5 parts by mass of styrene (concentration: 20 mass %) was added to the reactor.

Next, n-butyllithium at 0.066 parts by mass per 100 parts by mass in total of monomers, N,N,N',N'-tetramethylethylenediamine at 1.8 mol per mol of n-butyllithium, and sodium-t-pentoxide at 0.05 mol per mol of n-butyllithium were added thereto, followed by polymerization at 70° C. for 20 minutes.

Next, a cyclohexane solution containing 22 parts by mass of styrene, and a cyclohexane solution containing 63 parts by mass of butadiene (concentration: 20 mass %) were added thereto, followed by polymerization at 70° C. for 1 hour.

Next, a cyclohexane solution containing 7.5 parts by mass of styrene was added thereto, followed by polymerization at 60° C. for 20 minutes.

Then, the polymerization reaction was terminated by the addition of methanol.

The copolymer thus obtained had a styrene content of 37 mass %, a polystyrene block content of 15 mass %, a vinyl bond content of 75% before hydrogenation in the polymer block (B3), and a weight-average molecular weight of 156,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperature of −25° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b2).

Production Example 16: Hydrogenated Copolymer (b3)

Batch polymerization was performed using a vessel-type reactor (internal capacity: 10 L) equipped with a stirring apparatus and a jacket.

First, a cyclohexane solution containing 7.5 parts by mass of styrene (concentration: 20 mass %) was added to the reactor.

Next, n-butyllithium at 0.080 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 36 parts by mass of styrene, and a cyclohexane solution containing 49 parts by mass of butadiene (concentration: 20 mass %) were added thereto, followed by polymerization at 70° C. for 1 hour.

Next, a cyclohexane solution containing 7.5 parts by mass of styrene was added thereto, followed by polymerization at 60° C. for 20 minutes.

Then, the polymerization reaction was terminated by the addition of methanol.

The copolymer thus obtained had a styrene content of 51 mass %, a polystyrene block content of 15 mass %, a vinyl bond content of 25% before hydrogenation in the polymer block (B3), and a weight-average molecular weight of 151,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperature of −14° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b3).

Production Example 17: Hydrogenated Copolymer (b4)

Batch polymerization was performed using a vessel-type reactor (internal capacity: 10 L) equipped with a stirring apparatus and a jacket.

First, a cyclohexane solution containing 15 parts by mass of styrene (concentration: 20 mass %) was added to the reactor.

Next, n-butyllithium at 0.085 parts by mass per 100 parts by mass in total of monomers, and N,N,N',N'-tetramethylethylenediamine at 0.8 mol per mol of n-butyllithium were added thereto, followed by polymerization at 70° C. for 5 minutes.

Next, a cyclohexane solution containing 3 parts by mass of butadiene (concentration: 20 mass %) were added thereto, followed by polymerization at 70° C. for 5 minutes.

Next, a cyclohexane solution containing 29 parts by mass of butadiene and 50 parts by mass of styrene (concentration: 20 mass %) was supplied such that the reaction temperature was constant, followed by polymerization at 70° C. for 45 minutes.

Next, a cyclohexane solution containing 3 parts by mass of butadiene was added thereto, followed by polymerization at 70° C. for 5 minutes.

Finally, tetraethoxysilane was added at 0.2 mol per mol of n-butyllithium and reacted at 70° C. for 30 minutes.

Then, the polymerization reaction was terminated by the addition of methanol.

The copolymer thus obtained had a styrene content of 65 mass %, a polystyrene block content of 15 mass %, a vinyl bond content of 30% before hydrogenation in the block copolymer (B3), and a weight-average molecular weight of 301,000.

The coupling g rate determined by a peak are ratio of a GPC curve was 70%.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperature of 25° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b4).

Production Example 18: Hydrogenated Copolymer (b5)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.084 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 77 parts by mass of styrene, and a cyclohexane solution containing 13 parts by mass of butadiene (concentration: 20 mass %) were added thereto, followed by polymerization at 70° C. for 1 hour.

Next, ethyl benzoate was added at 0.25 mol per mol of n-butyllithium and reacted at 70° C. for 10 minutes.

Then, the polymerization reaction was terminated by the addition of methanol.

The copolymer thus obtained had a styrene content of 87 mass %, a polystyrene block content of 10 mass %, a vinyl bond content of 25% before hydrogenation in the polymer block (B3), and a weight-average molecular weight of 193,000.

The coupling rate determined by a peak area ratio of a GPC curve was 50%.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperatures of 64° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b5).

Comparative Production Example 19: Hydrogenated Copolymer (b6)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.080 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 15 parts by mass of styrene, and a cyclohexane solution containing 75 parts by mass of butadiene (concentration: 20 mass %) were added thereto, followed by polymerization at 70° C. for 1 hour.

Next, a cyclohexane solution containing 5 parts by mass of styrene was added thereto, followed by polymerization at 60° C. for 20 minutes.

Then, the polymerization reaction was terminated by the addition of methanol.

The copolymer thus obtained had a styrene content of 25 mass %, a polystyrene block content of 10 mass %, a vinyl bond content of 25% before hydrogenation in the polymer block (B3), and a weight-average molecular weight of 135,000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperature of −33° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b6).

Comparative Production Example 20:
Hydrogenated Copolymer (b7)

Batch polymerization was performed using a vessel-type reactor (internal capacity: 10 L) equipped with a stirring apparatus and a jacket.

First, a cyclohexane solution containing 34 parts by mass of styrene (concentration: 20 mass %) was added to the reactor.

Next, n-butyllithium at 0.062 parts by mass per 100 parts by mass in total of monomers, and N,N,N',N'-tetramethylethylenediamine (hereinafter, referred to as "TMEDA") at 0.35 mol per mol of n-butyllithium were added thereto, followed by polymerization at 70° C. for 40 minutes.

Next, a cyclohexane solution containing 32 parts by mass of butadiene (concentration: 20 mass %) were added thereto, followed by polymerization at 70° C. for 40 minutes.

Next, a cyclohexane solution containing 34 parts by mass of styrene was added thereto, followed by polymerization at 70° C. for 40 minutes.

Then, the polymerization reaction was terminated by the addition of methanol.

The copolymer thus obtained had a styrene content of 68 mass %, a polystyrene block content of 68 mass %, and a weight-average molecular weight of 93,000.

To the obtained copolymer, the hydrogenation catalyst prepared as described above was added at 100 ppm based on Ti per 100 parts by mass of the polymer. Hydrogenation reaction was performed at a temperature of 80° C. at a hydrogen pressure of 0.7 MPa.

The obtained hydrogenated copolymer had a degree of hydrogenation of 98% and a tan δ peak temperature of −41° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b7).

Comparative Production Example 21:
Hydrogenated Copolymer (b8)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.084 parts by mass per 100 parts by mass in total of monomers, and N,N,N',N'-tetramethylethylenediamine at 0.35 mol per mol of n-butyllithium were added thereto, followed by polymerization at 70° C. for 20 minutes.

Next, a cyclohexane solution containing 82 parts by mass of styrene, and a cyclohexane solution containing 8 parts by mass of butadiene (concentration: 20 mass %) were added thereto, followed by polymerization at 70° C. for 1 hour.

Next, ethyl benzoate was added at 0.25 mol per mol of n-butyllithium and reacted at 70° C. for 10 minutes.

Then, the polymerization reaction was terminated by the addition of methanol.

The copolymer thus obtained had a styrene content of 92 mass %, a polystyrene block content of 10 mass %, a vinyl bond content of 25% before hydrogenation in the polymer block (B3), and a weight-average molecular weight of 193,000.

The coupling rate determined by a peak area ratio of a GPC curve was 50%.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a degree of hydrogenation of 98% and a tan δ peak temperatures of 72° C.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (b8).

TABLE 1

| Hydrogenated copolymer (a) | | Production Example 1 (a1) | Production Example 2 (a2) | Production Example 3 (a3) | Production Example 4 (a4) | Production Example 5 (a5) | Production Example 6 (a6) | Production Example 7 (a7) | Production Example 8 (a8) |
|---|---|---|---|---|---|---|---|---|---|
| Total vinyl aromatic compound content (wt. %) | | 34 | 29 | 31 | 29 | 44 | 34 | 34 | 34 |
| (B1) | Content (wt. %) | 46 | 32 | 46 | 46 | 46 | 46 | 46 | 46 |
| | Amount of vinyl aromatic compound (wt. %) | 54 | 56 | 48 | 44 | 77 | 54 | 54 | 54 |
| (B2) | Content (wt. %) | 45 | 57 | 45 | 45 | 45 | 45 | 45 | 45 |
| | Vinyl bond content (mol %) | 77 | 77 | 77 | 77 | 77 | 91 | 77 | 61 |
| | Weight-average molecular weight (10K) | 14.8 | 13.7 | 14.8 | 14.8 | 14.8 | 14.8 | 14.8 | 14.8 |

TABLE 1-continued

| Hydrogenated copolymer (a) | Production Example 1 (a1) | Production Example 2 (a2) | Production Example 3 (a3) | Production Example 4 (a4) | Production Example 5 (a5) | Production Example 6 (a6) | Production Example 7 (a7) | Production Example 8 (a8) |
|---|---|---|---|---|---|---|---|---|
| Degree of hydrogenation (%) | 98 | 98 | 98 | 98 | 98 | 98 | 75 | 98 |
| tanδ peak temperature (° C.): −20° C. or higher | 25 | 15 | 19 | 12 | 39 | 25 | 15 | 25 |
| tanδ peak temperature (° C.): lower than −20° C. | −30 | −32 | −30 | −30 | −28 | −25 | −38 | −35 |

TABLE 2

| Hydrogenated copolymer (a) | | Comparative Production Example 9 (a9) | Comparative Production Example 10 (a10) | Comparative Production Example 11 (a11) | Comparative Production Example 12 (a12) | Comparative Production Example 13 (a13) |
|---|---|---|---|---|---|---|
| Total vinyl aromatic compound content (wt. %) | | 34 | 51 | 48 | 26 | 48 |
| (B1) | Content (wt. %) | 46 | 85 | 0 | 46 | 46 |
|  | Amount of vinyl aromatic compound (wt. %) | 54 | 36 | — | 38 | 84 |
| (B2) | Content (wt. %) | 45 | 0 | 52 | 45 | 45 |
|  | Vinyl bond content (mol %) | 50 | — | 76 | 77 | 77 |
|  | Weight-average molecular weight (10K) | 14.6 | 15.1 | 16.5 | 14.8 | 14.8 |
| Degree of hydrogenation (%) | | 98 | 98 | 99 | 98 | 98 |
| tanδ peak temperature (° C.): −20° C. or higher | | 22 | −14 | None | 9 | 49 |
| tanδ peak temperature (° C.): lower than −20° C. | | −50 | None | −28 | −23 | −23 |

TABLE 3

| Hydrogenated copolymer (b) | Production Example 14 (b1) | Production Example 15 (b2) | Production Example 16 (b3) | Production Example 17 (b4) | Production Example 18 (b5) | Comparative Production Example 19 (b6) | Comparative Production Example 20 (b7) | Comparative Production Example 21 (b8) |
|---|---|---|---|---|---|---|---|---|
| Total vinyl aromatic compound content (wt. %) | 67 | 37 | 51 | 65 | 87 | 25 | 68 | 92 |
| (B3) Content (wt. %) | 80 | 85 | 85 | 79 | 90 | 90 | 0 | 90 |
| Amount of vinyl aromatic compound (wt. %) | 59 | 26 | 42 | 63 | 86 | 16 | — | 91 |
| Weight-average molecular weight (10K) | 19.3 | 15.6 | 15.1 | 30.1 | 19.3 | 13.5 | 9.3 | 19.3 |
| Degree of hydrogenation (%) | 98 | 98 | 98 | 98 | 98 | 98 | 98 | 98 |
| tanδ peak temperature (° C.): −35° C. or higher | 18 | −25 | −14 | 25 | 64 | −33 | −41 | 72 |
| tanδ peak temperature (° C.): lower than −35° C. | None | None | None | None | None | None | None | None |

TABLE 4

| Blending unit: parts by mass | | Example 1 | Example 2 | Example 3 | Example 4 | Example 5 | Example 6 | Example 7 | Example 8 | Example 9 |
|---|---|---|---|---|---|---|---|---|---|---|
| Component (c): h-PP | | 20 | 20 | 20 | 20 | 20 | 20 | 20 | 20 | 20 |
| Hydrogenated copolymer (a) | a1 | 70 | 55 | 40 | 10 | 40 | 40 | 40 | | |
| | a2 | | | | | | | | 40 | |
| | a9 | | | | | | | | | |
| | a10 | | | | | | | | | |
| | a11 | | | | | | | | | |
| | a3 | | | | | | | | | 40 |
| | a5 | | | | | | | | | |
| | a6 | | | | | | | | | |
| | a7 | | | | | | | | | |
| | a4 | | | | | | | | | |

TABLE 4-continued

| Blending unit: parts by mass | | Example 1 | Example 2 | Example 3 | Example 4 | Example 5 | Example 6 | Example 7 | Example 8 | Example 9 |
|---|---|---|---|---|---|---|---|---|---|---|
| | a13 | | | | | | | | | |
| | a8 | | | | | | | | | |
| | a12 | | | | | | | | | |
| Hydrogenated copolymer (b) | b1 | 10 | 25 | 40 | 70 | | | | 40 | 40 |
| | b2 | | | | | 40 | | | | |
| | b3 | | | | | | 40 | | | |
| | b6 | | | | | | | | | |
| | b7 | | | | | | | | | |
| | b5 | | | | | | | 40 | | |
| | b8 | | | | | | | | | |
| Abrasion resistance | | 5 | 5 | 5 | 5 | 4 | 3 | 2 | 5 | 3 |
| Tensile elongation (−30° C.) | | 5 | 5 | 5 | 4 | 5 | 5 | 2 | 3 | 5 |
| Low stickiness | | 2 | 3 | 4 | 5 | 4 | 5 | 5 | 5 | 4 |
| Processability | | 4 | 5 | 4 | 3 | 4 | 3 | 3 | 3 | 4 |
| Total score | | 16 | 18 | 18 | 17 | 17 | 16 | 12 | 16 | 16 |

TABLE 5

| Blending unit: parts by mass | | Example 10 | Example 11 | Example 12 | Example 13 | Example 14 | Example 15 | Example 16 | Example 17 | Example 18 |
|---|---|---|---|---|---|---|---|---|---|---|
| Component (c): h-PP | | 20 | 20 | 20 | 20 | 20 | 50 | 80 | 90 | 30 |
| Hydrogenated copolymer (a) | a1 | | | | | | 25 | 10 | 5 | 10 |
| | a2 | | | | | | | | | |
| | a9 | | | | | | | | | |
| | a10 | | | | | | | | | |
| | a11 | | | | | | | | | |
| | a3 | | | | | | | | | |
| | a5 | 40 | | | | | | | | |
| | a6 | | 40 | | | | | | | |
| | a7 | | | 40 | | | | | | |
| | a4 | | | | 40 | | | | | |
| | a13 | | | | | | | | | |
| | a8 | | | | | 40 | | | | |
| | a12 | | | | | | | | | |
| Hydrogenated copolymer (b) | b1 | 40 | 40 | 40 | 40 | 40 | 25 | 10 | 5 | 60 |
| | b2 | | | | | | | | | |
| | b3 | | | | | | | | | |
| | b6 | | | | | | | | | |
| | b7 | | | | | | | | | |
| | b5 | | | | | | | | | |
| | b8 | | | | | | | | | |
| Abrasion resistance | | 2 | 5 | 5 | 2 | 5 | 4 | 3 | 2 | 5 |
| Tensile elongation (−30° C.) | | 3 | 5 | 5 | 5 | 3 | 3 | 2 | 2 | 4 |
| Low stickiness | | 5 | 4 | 2 | 4 | 5 | 4 | 5 | 5 | 3 |
| Processability | | 4 | 5 | 5 | 4 | 2 | 4 | 3 | 3 | 4 |
| Total score | | 14 | 19 | 17 | 15 | 15 | 15 | 13 | 12 | 16 |

TABLE 6

| Blending unit: parts by mass | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Component (c): h-PP | | 20 | 20 | 20 | 20 | 20 | 20 | 20 | 20 | 20 |
| Hydrogenated copolymer (a) | a1 | 80 | | 40 | 40 | 40 | | | | |
| | a2 | | | | | | | | | |
| | a9 | | | | | | 40 | | | |
| | a10 | | | | | | | 40 | | |
| | a11 | | | | | | | | 40 | |
| | a3 | | | | | | | | | |
| | a5 | | | | | | | | | |
| | a6 | | | | | | | | | |
| | a7 | | | | | | | | | |
| | a4 | | | | | | | | | |
| | a13 | | | | | | | | | 40 |
| | a8 | | | | | | | | | |
| | a12 | | | | | | | | | |

TABLE 6-continued

| Blending unit: parts by mass | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Hydrogenated copolymer (b) | b1 | | 80 | | | | 40 | 40 | 40 | 40 |
| | b2 | | | | | | | | | |
| | b3 | | | | | | | | | |
| | b6 | | | 40 | | | | | | |
| | b7 | | | | 40 | | | | | |
| | b5 | | | | | | | | | |
| | b8 | | | | | 40 | | | | |
| Abrasion resistance | | 5 | 5 | 1 | 1 | 1 | 5 | 5 | 2 | 1 |
| Tensile elongation (−30° C.) | | 5 | 1 | 3 | 3 | 1 | 1 | 1 | 1 | 3 |
| Low stickiness | | 1 | 2 | 4 | 3 | 5 | 5 | 4 | 4 | 5 |
| Processability | | 3 | 1 | 3 | 2 | 3 | 2 | 1 | 4 | 4 |
| Total score | | 14 | 9 | 11 | 9 | 10 | 13 | 11 | 11 | 13 |

TABLE 7

| Blending unit: parts by mass | | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| Component (c): h-PP | | 33 | 20 | 80 | 80 | 80 | 80 | 80 | 30 | 30 |
| Hydrogenated copolymer (a) | a1 | | | 10 | 10 | | | | 70 | |
| | a2 | | | | | | | | | |
| | a9 | | | | | 10 | | | | |
| | a10 | | | | | | 10 | | | |
| | a11 | | | | | | | 10 | | |
| | a3 | | | | | | | | | |
| | a5 | | | | | | | | | |
| | a6 | | | | | | | | | |
| | a7 | | | | | | | | | |
| | a4 | | | | | | | | | |
| | a13 | | | | | | | | | |
| | a8 | | | | | | | | | |
| | a12 | | 40 | | | | | | | |
| Hydrogenated copolymer (b) | b1 | 67 | 40 | | | 10 | 10 | 10 | | 70 |
| | b2 | | | | | | | | | |
| | b3 | | | | | | | | | |
| | b6 | | | 10 | | | | | | |
| | b7 | | | | 10 | | | | | |
| | b5 | | | | | | | | | |
| | b8 | | | | | | | | | |
| Abrasion resistance | | 5 | 1 | 1 | 2 | 3 | 3 | 2 | 5 | 5 |
| Tensile elongation (−30° C.) | | 1 | 5 | 2 | 1 | 1 | 1 | 1 | 4 | 1 |
| Low stickiness | | 1 | 4 | 3 | 5 | 5 | 4 | 4 | 1 | 3 |
| Processability | | 1 | 4 | 4 | 2 | 1 | 1 | 4 | 3 | 1 |
| Total score | | 8 | 15 | 10 | 10 | 10 | 9 | 11 | 13 | 10 |

TABLE 8

| Unit: parts by mass | | Example 19 | Example 20 | Example 21 | Example 22 | Example 23 | Example 24 | Example 25 |
|---|---|---|---|---|---|---|---|---|
| Rubber-like polymer | | | | | 50 | | | |
| Polypropylene resin | | | | | 40 | | | |
| Paraffin oil | | | | | 80 | | | |
| Hydrogenated copolymer (a) | (a1) | 40 | 25 | 10 | 45 | 40 | 25 | 25 |
| | (a9) | | | | | | | |
| | (a3) | | | | | | | |
| | (a5) | | | | | | | |
| | (a4) | | | | | | | |
| | (a13) | | | | | | | |
| | (a8) | | | | | | | |
| | (a12) | | | | | | | |

TABLE 8-continued

| Unit: parts by mass | | Example 19 | Example 20 | Example 21 | Example 22 | Example 23 | Example 24 | Example 25 |
|---|---|---|---|---|---|---|---|---|
| Hydrogenated copolymer (b) | (b1) | 10 | 25 | 40 | | | | |
| | (b4) | | | | 5 | 10 | 25 | |
| | (b5) | | | | | | | 25 |
| | (b6) | | | | | | | |
| | (b8) | | | | | | | |
| Abrasion resistance | | 3 | 4 | 4 | 4 | 5 | 5 | 2 |
| C-set(70° C.) | | 3 | 4 | 4 | 3 | 4 | 5 | 3 |
| C-set(100° C.) | | 3 | 4 | 4 | 3 | 4 | 5 | 2 |
| Low-temperature tensile elongation | | 5 | 4 | 3 | 5 | 5 | 4 | 2 |
| Low stickiness | | 2 | 3 | 3 | 3 | 3 | 4 | 5 |
| Total score | | 16 | 19 | 18 | 18 | 21 | 23 | 14 |

TABLE 9

| Unit: parts by mass | | Example 26 | Example 27 | Example 28 | Example 29 | Example 30 | Example 31 |
|---|---|---|---|---|---|---|---|
| Rubber-like polymer | | | | | 50 | | |
| Polypropylene resin | | | | | 40 | | |
| Paraffin oil | | | | | 80 | | |
| Hydrogenated copolymer (a) | (a1) | | | | 25 | 10 | 5 |
| | (a9) | | | | | | |
| | (a3) | 25 | | | | | |
| | (a5) | | 25 | | | | |
| | (a4) | | | 25 | | | |
| | (a13) | | | | | | |
| | (a8) | | | | 25 | | |
| | (a12) | | | | | | |
| Hydrogenated copolymer (b) | (b1) | 25 | 25 | 25 | | | |
| | (b4) | | | | | 40 | 45 |
| | (b5) | | | | | | |
| | (b6) | | | | | | |
| | (b8) | | | | | | |
| Abrasion resistance | | 3 | 2 | 2 | 3 | 5 | 4 |
| C-set(70° C.) | | 4 | 3 | 4 | 2 | 5 | 4 |
| C-set(100° C.) | | 4 | 2 | 4 | 2 | 5 | 4 |
| Low-temperature tensile elongation | | 4 | 3 | 4 | 3 | 3 | 3 |
| Low stickiness | | 3 | 5 | 2 | 4 | 4 | 4 |
| Total score | | 17 | 15 | 16 | 12 | 22 | 19 |

TABLE 10

| Unit: parts by mass | | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|
| Rubber-like polymer | | | | | | 50 | | | |
| Polypropylene resin | | | | | | 40 | | | |
| Paraffin oil | | | | | | 80 | | | |
| Hydrogenated copolymer (a) | (a1) | 50 | | | | | | 25 | 25 |
| | (a9) | | | | 25 | | | | |
| | (a3) | | | | | | | | |
| | (a5) | | | | | | | | |
| | (a4) | | | | | | | | |
| | (a13) | | | | | | 25 | | |
| | (a8) | | | | | | | | |
| | (a12) | | | | | | 25 | | |
| Hydrogenated copolymer (b) | (b1) | | 50 | | 25 | 25 | 25 | | |
| | (b4) | | | 50 | | | | | |
| | (b5) | | | | | | | | |
| | (b6) | | | | | | | 25 | |
| | (b8) | | | | | | | | 25 |
| Abrasion resistance | | 2 | 2 | 3 | 2 | 1 | 1 | 1 | 1 |
| C-set(70° C.) | | 3 | 1 | 2 | 1 | 3 | 4 | 2 | 2 |
| C-set(100° C.) | | 3 | 1 | 2 | 1 | 1 | 4 | 2 | 1 |

TABLE 10-continued

| Unit: parts by mass | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|
| Low-temperature tensile elongation | 5 | 1 | 1 | 1 | 3 | 4 | 4 | 1 |
| Low stickiness | 1 | 3 | 5 | 4 | 5 | 2 | 5 | 5 |
| Total score | 14 | 8 | 13 | 9 | 13 | 15 | 14 | 10 |

TABLE 11

| Unit: parts by mass | | Example 32 | Example 33 | Comparative Example 27 | Comparative Example 28 |
|---|---|---|---|---|---|
| Rubber-like polymer | | 50 | 50 | 50 | 50 |
| Polypropylene resin | | 30 | 50 | 30 | 50 |
| Paraffin oil | | 90 | 70 | 90 | 70 |
| Hydrogenated copolymer (a) | (a1) | 10 | 10 | | |
| | (a9) | | | | |
| | (a3) | | | | |
| | (a5) | | | | |
| | (a4) | | | | |
| | (a13) | | | | |
| | (a8) | | | | |
| | (a12) | | | | |
| Hydrogenated copolymer (b) | (b1) | | | | |
| | (b4) | 40 | 40 | 50 | 50 |
| | (b5) | | | | |
| | (b6) | | | | |
| | (b8) | | | | |
| Abrasion resistance | | 4 | 5 | 2 | 4 |
| C-set(70° C.) | | 5 | 5 | 2 | 2 |
| C-set(100° C.) | | 5 | 5 | 2 | 2 |
| Low-temperature tensile elongation | | 3 | 3 | 1 | 1 |
| Low stickiness | | 3 | 5 | 4 | 5 |
| Total score | | 20 | 23 | 11 | 14 |

From Tables 6 and 7, the polypropylene resin composition in Comparative Examples 1 to 18 had the score of "1" in abrasion resistance, low-temperature mechanical characteristics, and balance among characteristics, or had a total score of "less than 12", and was thus found to be inferior.

FIG. 1 shows the temperature dependence of a loss tangent in Production Example 1 (a1) of the hydrogenated copolymer (a) and Production Example 14 (b1) of the hydrogenated copolymer (b).

According to FIG. 1, the hydrogenated copolymer (a) has one peak (glass transition temperature, Tg) each at −20° C. or higher and at −20° C. or lower, and the hydrogenated copolymer (b) has one peak (glass transition temperature, Tg) at −35° C. or higher.

FIGS. 2(A) and 2(B) each show an image obtained by morphologically observing a molded article of a resin composition containing a hydrogenated copolymer and a polypropylene resin in Comparative Examples 17 and 18 under a transmission electron microscope (ruthenium staining). FIG. 2(A) corresponds to Comparative Example 17, and FIG. 2(B) corresponds to Comparative Example 18.

FIG. 3 shows the temperature dependence of the loss tangents of a resin composition containing a hydrogenated copolymer and a polypropylene resin, and the polypropylene resin alone in Comparative Examples 17 and 18.

TABLE 12

| Unit: parts by mass | | Example 34 | Example 35 | Example 36 | Example 37 | Example 38 | Example 39 | Comparative Example 29 | Comparative Example 30 | Comparative Example 31 | Comparative Example 32 | Comparative Example 33 |
|---|---|---|---|---|---|---|---|---|---|---|---|---|
| Hydrogenated copolymer (a) | (a1) | 80 | 50 | 30 | 30 | 30 | 30 | 100 | | | | 30 |
| | (a9) | | | | | | | | | | 30 | |
| Hydrogenated copolymer (b) | (b2) | | | | 70 | | | | 100 | | | |
| | (b3) | 20 | 50 | 70 | | 65 | 60 | | | 100 | 70 | |
| | (b7) | | | | | | | | | | | |
| Additional | Tackifier Arkon P100 | | | | | 5 | | | | | | 70 |
| | Tuftec H1221 | | | | | | 10 | | | | | |
| Initial tackiness | | 3 | 3 | 2 | 3 | 3 | 3 | 3 | 2 | 1 | 1 | 1 |
| Adhesion increasing property | | 2 | 2 | 2 | 3 | 3 | 3 | 1 | 3 | 3 | 3 | 3 |
| Feedability | | 2 | 3 | 3 | 2 | 3 | 3 | 1 | 1 | 3 | 3 | 3 |
| Total score | | 7 | 8 | 7 | 8 | 9 | 9 | 5 | 6 | 7 | 7 | 7 |

[Polypropylene Resin Composition]

From Tables 4 and 5, the polypropylene resin composition containing two hydrogenated copolymers having a particular configuration, i.e., the hydrogenated copolymer (a) and the hydrogenated copolymer (b), in Examples 1 to 18 had a total score of "12 or greater" without the score of "1" in abrasion resistance, low-temperature mechanical characteristics, and balance among characteristics, and was thus found to be excellent.

From FIG. 2, the hydrogenated copolymer (a1) was finely dispersed in the polypropylene resin in the resin composition of Comparative Example 17, while the hydrogenated copolymer (b1) formed a sea-island structure with the polypropylene resin in the resin composition of Comparative Example 18.

From FIG. 3, the Tg peak, which was 0° C. for the polypropylene resin alone, shifted to lower temperatures for the resin composition containing the hydrogenated copolymer (a1) and the polypropylene resin in Comparative Example 17, and overlapped with the Tg peak of the hydrogenated copolymer (a1) (−20° C. or lower), with change to a trapezoidal shape. Furthermore, the resin composition of Comparative Example 17 also had a Tg peak at −20° C. or higher.

The resin composition containing the hydrogenated copolymer (b1) and the polypropylene resin in Comparative Example 18 had one Tg peak at −20° C. or higher.

Thus, the polypropylene resin composition containing the hydrogenated copolymer (a) had a Tg peak in a low temperature region of −20° C. or lower and improved compatibility with PP, demonstrating that the low-temperature mechanical characteristics of the polypropylene resin composition can be satisfied at a high level. The polypropylene resin composition containing the hydrogenated copolymer (b) had a Tg peak with a large tan δ height at −20° C. or higher, demonstrating that the abrasion resistance of the polypropylene resin composition can be satisfied at a high level.

In the present invention, the hydrogenated copolymer (a) and the hydrogenated copolymer (b) were used in combination at a particular ratio in order to provide a polypropylene resin composition excellent in abrasion resistance, low-temperature characteristics, and balance among characteristics, which was not achieved by conventional techniques.

FIGS. 4(A) and 4(B) show TEM images of Comparative Example 18 and Example 18.

FIG. 4(A) corresponds to Comparative Example 18, and FIG. 4(B) corresponds to Example 18.

According to this drawing, use of the hydrogenated copolymer (a1) and the hydrogenated copolymer (b1) in combination at a particular ratio in the polypropylene resin composition of Example 18 was found to change the morphology of the polypropylene resin composition from a sea-island structure (Comparative Example 18) to a co-continuous structure (Example 18).

In FIG. 4, the black portion depicts a hydrogenated copolymer, and the while portion depicts a polypropylene resin.

The "sea-island structure" refers to a state in which the polypropylene resin and the hydrogenated copolymer each exist alone. The "co-continuous structure" refers to a state having a continuously linked shape in which a hydrogenated block copolymer of a component serving as matrix exists while the polypropylene resin covers a portion or the whole thereof.

The polypropylene resin composition containing two hydrogenated copolymers having a content of a vinyl aromatic compound monomer unit and a content of a polymer block mainly containing a vinyl aromatic compound, or a microstructure such as a vinyl bond content within particular ranges according to the present invention forms a co-continuous structure without forming such a simple sea-island structure, and therefore, can satisfy abrasion resistance, low-temperature mechanical characteristics, and balance among characteristics at a high level.

Whether or not the polypropylene resin composition forms a co-continuous structure can be confirmed using a transmission electron microscope.

FIGS. 5(A) to 5(C) each show an elastic modulus mapping diagram (which indicates color gradation of elastic moduli and shows an elastic modulus distribution in the resin composition) of an injection-molded plate of a polypropylene resin composition under AFM (atomic force microscope) in Example 18.

FIG. 5(A) shows the elastic modulus mapping diagram of a surface layer portion of the molded plate under AFM.

FIG. 5(B) shows the elastic modulus mapping diagram of a core portion of the molded plate under AFM.

FIG. 5(C) shows an enlarged view of the elastic modulus mapping diagram of the core portion of the molded plate under AFM.

According to this drawing, by use of the hydrogenated copolymer (a1) and the hydrogenated copolymer (b1) in combination at a particular ratio, the hydrogenated copolymers as a compatibilizing agent are unevenly distributed so as to surround the interface between the hydrogenated copolymers (b1 and a1: black) and the polypropylene resin (white), as shown in FIGS. 5(B) and 5(C), in the core portion (core layer) of the injection-molded plate of the polypropylene resin composition, and the polypropylene resin composition forms a co-continuous structure in the surface layer portion (skin layer), as shown in FIG. 5(A).

FIGS. 6(A) to 6(C) each show an elastic modulus mapping diagram (which indicates color gradation of elastic moduli and shows an elastic modulus distribution in the resin composition) of an injection-molded plate of a polypropylene resin composition under AFM (atomic force microscope) in Comparative Example 18.

FIG. 6(A) shows the elastic modulus mapping diagram of a surface layer portion of the molded plate under AFM.

FIG. 6(B) shows the elastic modulus mapping diagram of a core portion of the molded plate under AFM.

FIG. 6(C) shows an enlarged view of the elastic modulus mapping diagram of the core portion of the molded plate under AFM.

The polypropylene resin composition of the present embodiment containing two hydrogenated copolymers having a content of a vinyl aromatic compound monomer unit or a microstructure such as a vinyl bond content within particular ranges forms a co-continuous structure without forming a simple sea-island structure, and therefore, can satisfy abrasion resistance, low-temperature mechanical characteristics, and balance among characteristics at a high level.

The degree of uneven distribution of the polypropylene resin and each component of the hydrogenated block copolymers, and whether the polypropylene resin composition forms a co-continuous structure can be confirmed using an atomic force microscope (elastic modulus mapping).

FIGS. 7(A) and 7(B) show a laser microscope observation image of the surface of a molded article of a polypropylene resin composition after abrasion (the number of times of Gakushin abrasion: 10000 times) in Example 18 and Comparative Example 18.

The test was verified not only by the rate of change in mass between before and after abrasion evaluation of the resin composition but by the surface morphology observation of the abrasion surface.

As shown in FIG. 7(A), a grain shape remained even after abrasion (the number of times of Gakushin abrasion: 10000 times) in the polypropylene resin composition of Example 18 containing two hydrogenated copolymers having a content of a vinyl aromatic compound monomer unit or a microstructure such as a vinyl bond content within particular ranges. Thus, it was able to be confirmed that abrasion resistance was satisfied at a high level.

On the other hand, as shown in FIG. 7(B), a grain shape disappeared by scraping after abrasion in the polypropylene resin composition of Comparative Example 18 consisting only of the hydrogenated copolymer (b), demonstrating abrasion in a rutted pattern.

[Thermoplastic Elastomer Composition]

From Tables 8 to 11, the thermoplastic elastomer composition containing two hydrogenated copolymers within particular ranges that satisfied the required components of the present invention, i.e., the hydrogenated copolymer (a) and the hydrogenated copolymer (b), in Examples 19 to 33 had a total score of "15 or greater" without the score of "1" in abrasion resistance, low-temperature mechanical characteristics, and performance balance, and was thus found to be excellent.

The thermoplastic elastomer composition that did not satisfy the required components of the present invention in Comparative Examples 19 to 28 had the score of "1" in abrasion resistance, low-temperature mechanical characteristics, and performance balance, or had a total score of "less than 15", and was thus found to be inferior.

[Adhesive Film]

From Table 12, the adhesive film made of the adhesive layer containing two hydrogenated copolymers within particular ranges that satisfied the required components of the present invention, i.e., the hydrogenated copolymer (a) and the hydrogenated copolymer (b), in Examples 34 to 39 was free from the score of "1" in initial tackiness, adhesion increasing properties and feedability, and performance balance thereamong, and was thus found to be excellent.

The adhesive film that did not satisfy the required components of the present invention in Comparative Examples 29 to 33 had the score of "1" in initial tackiness, adhesion increasing properties and feedability, and performance balance thereamong, and was thus found to be inferior.

The present application is based on the Japanese patent application filed in the Japan Patent Office on May 23, 2019 (Japanese Patent Application No. 2019-097021), and the Japanese patent application filed in the Japan Patent Office on Nov. 15, 2019 (Japanese Patent Application No. 2019-207189), the contents of which are incorporated herein by reference.

INDUSTRIAL APPLICABILITY

A polypropylene resin composition, a thermoplastic elastomer composition, and an adhesive film containing the hydrogenated copolymer of the present invention have industrial applicability in a wide range of fields such as packaging materials for various apparel items, packaging materials for various foods, household sundries packaging materials, industrial material packaging materials, lamination materials for various rubber products, resin products, leather products, and the like, elastic tapes for use in paper diapers and the like, industrial products such as dicing films, adhesive protective films for use in the protection of building materials or steel plates, base materials for adhesive films, trays for meat and fish, packs for vegetables and fruits, sheet products such as frozen food containers, home appliances such as televisions, stereos, and cleaners, materials for automobile interior or exterior parts such as bumper parts, body panels, side seals, and interior (instrumental panel, door trim, airbag cover, etc.) skin materials, road paving materials, waterproof materials, water-shielding sheets, packings for civil engineering, daily goods, leisure goods, toys and games, industrial products, furniture supplies, stationery products such as writing utensils, clear pockets, folders, and file spines, and medical supplies such as infusion bags.

The invention claimed is:

1. A hydrogenated copolymer composition comprising
   a hydrogenated copolymer (a) prepared by hydrogenating a copolymer of a vinyl aromatic compound and a conjugated diene compound, and
   a hydrogenated copolymer (b) prepared by hydrogenating a copolymer of a vinyl aromatic compound and a conjugated diene compound, wherein
   the hydrogenated copolymer (a) has one or more tan δ peaks at −20° C. or higher and one or more tan δ peaks at lower than −20° C. in viscoelasticity measurement (1 Hz),
   the hydrogenated copolymer (b) has only one tan δ peak at 18° C. or higher in viscoelasticity measurement (1 Hz),
   a mass ratio (a)/(b) of a content of the hydrogenated copolymer (a) to a content of the hydrogenated copolymer (b) is 5/95 to 95/5,
   the hydrogenated copolymer (a) has a hydrogenated polymer block (B1) and a hydrogenated polymer block (B2),
   the hydrogenated polymer block (B1) consists of a vinyl aromatic compound and a conjugated diene compound and has a content of the vinyl aromatic compound of 40 to 80 mass %,
   the hydrogenated polymer block (B2) mainly comprises a conjugated diene compound and has a vinyl bond content of 60 to 100 mol % before hydrogenation, and
   the hydrogenated copolymer (b) has a hydrogenated polymer block (B3) consisting of a vinyl aromatic compound and a conjugated diene compound and a content of the vinyl aromatic compound in the hydrogenated polymer block (B3) is 20 to 90 mass %.

2. The hydrogenated copolymer composition according to claim 1, wherein the content of the vinyl aromatic compound in the hydrogenated polymer block (B1) in the hydrogenated copolymer (a) is 46 to 80 mass %.

3. The hydrogenated copolymer composition according to claim 1, wherein the mass ratio (a)/(b) of the content of the hydrogenated copolymer (a) to the content of the hydrogenated copolymer (b) in the hydrogenated copolymer is 5/95 to 70/30.

4. An adhesive film comprising a hydrogenated copolymer composition according to claim 1.

5. A resin composition comprising the hydrogenated copolymer composition according to claim 1 and a polypropylene resin (c), wherein
   a mass ratio of the polypropylene resin (c) to the total content of the hydrogenated copolymer (a) and the hydrogenated copolymer (b) [(c)/((a)+(b))] is 95/5 to 5/95.

6. A molded article of the resin composition according to claim 5.

* * * * *